(12) United States Patent
Kishi et al.

(10) Patent No.: US 12,456,582 B2
(45) Date of Patent: Oct. 28, 2025

(54) MULTILAYER CERAMIC CAPACITOR

(71) Applicant: Murata Manufacturing Co., Ltd., Nagaokakyo (JP)

(72) Inventors: Kotaro Kishi, Nagaokakyo (JP); Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 176 days.

(21) Appl. No.: 18/105,301

(22) Filed: Feb. 3, 2023

(65) Prior Publication Data

US 2023/0298818 A1    Sep. 21, 2023

(30) Foreign Application Priority Data

Mar. 15, 2022  (JP) ................ 2022-040689

(51) Int. Cl.
*H01G 4/12*  (2006.01)
*H01G 4/232*  (2006.01)
*H01G 4/30*  (2006.01)

(52) U.S. Cl.
CPC .............. *H01G 4/12* (2013.01); *H01G 4/232* (2013.01); *H01G 4/30* (2013.01)

(58) Field of Classification Search
CPC .......... H01G 4/30; H01G 4/232; H01G 4/12; H01G 4/248; H01G 4/005
USPC ............. 361/301.4, 303, 306.3, 321.1, 321.3
See application file for complete search history.

(56) References Cited

U.S. PATENT DOCUMENTS

| | | | |
|---|---|---|---|
| 9,362,054 B2* | 6/2016 | Park ................ | H01G 4/232 |
| 10,008,329 B2* | 6/2018 | Onoue .............. | H01G 4/232 |
| 2008/0080121 A1* | 4/2008 | Togashi ............ | H01G 4/30 361/303 |
| 2009/0190285 A1* | 7/2009 | Kusano ............ | H01G 4/30 361/321.4 |
| 2009/0316330 A1 | 12/2009 | Taniguchi et al. | |
| 2014/0185189 A1* | 7/2014 | Kim ................ | H01G 4/30 361/321.2 |
| 2015/0114705 A1* | 4/2015 | Ahn ................ | H01G 4/30 361/301.4 |
| 2015/0223340 A1* | 8/2015 | Jung ............... | H01G 4/008 156/89.12 |
| 2016/0163459 A1* | 6/2016 | Ikeda .............. | H01G 4/2325 361/301.4 |
| 2019/0088415 A1* | 3/2019 | Takashima ........ | H01G 4/30 |
| 2020/0105472 A1 | 4/2020 | Song et al. | |

(Continued)

FOREIGN PATENT DOCUMENTS

| | | |
|---|---|---|
| JP | 2010-003891 A | 1/2010 |
| JP | 2020-057753 A | 4/2020 |

(Continued)

*Primary Examiner* — Arun Ramaswamy
(74) *Attorney, Agent, or Firm* — Keating & Bennett, LLP

(57) ABSTRACT

A multilayer ceramic capacitor includes a multilayer body in which a dimension in a width direction>a dimension in a length direction>a dimension in a height direction is satisfied. A dimension in the length direction of each of lateral surface exposed portions is about 10% or more and about 44% or less with respect to the dimension in the length direction. A dimension of the external electrode in the length direction is about 17% or more and about 48% or less with respect to the dimension in the length direction.

18 Claims, 22 Drawing Sheets

(56) References Cited

U.S. PATENT DOCUMENTS

2020/0118755 A1\* 4/2020 Yajima .................. H01G 4/232
2021/0272754 A1\* 9/2021 Hsiao .................... H01G 4/012

FOREIGN PATENT DOCUMENTS

JP 2020-061524 A 4/2020
WO 2019/083891 A1 5/2019

\* cited by examiner

MULTILAYER CERAMIC CAPACITOR

CROSS REFERENCE TO RELATED APPLICATIONS

This application is based on and claims the benefit of priority from Japanese Patent Application No. 2022-040689, filed on Mar. 15, 2022, the content of which is incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known, each including a multilayer body with a multilayer configuration including a plurality of dielectric layers and a plurality of internal electrode layers alternately provided therein, and external electrodes provided on the multilayer body. A typical multilayer ceramic capacitor has a rectangular parallelepiped-shaped multilayer body with the dimension in the length direction L that is longer than the dimension in the width direction W. External electrodes are provided at both ends of the multilayer body in the length direction L. On the other hand, in order to reduce the equivalent series inductance (ESL), a so-called LW reversed multilayer ceramic capacitor is known in which the dimensional relationship between the length direction L and the width direction W of the multilayer body is reversed (see Japanese Unexamined Patent Application Publication Nos. 2020-57753 and 2020-61524).

Furthermore, in recent years, as the mounting density of a board increases, the mounting area in a multilayer ceramic capacitor decreases. Therefore, the mounting form of Package on Package (PoP) has been adopted, and the demand for the Land Side Capacitor (LSC) type-mounted multilayer ceramic capacitor on the lower end portion of the board has been increasing. As a multilayer ceramic capacitor mounted in the LSC type, a thin multilayer ceramic capacitor having a reduced height in the height direction is required.

SUMMARY OF THE INVENTION

However, as the multilayer ceramic capacitor becomes thinner, for example, about 150 μm or less, the strength of the multilayer ceramic capacitor decreases, and cracks may occur inside the multilayer ceramic capacitor when an external force is applied.

Preferred embodiments of the present invention provide LW reversed multilayer ceramic capacitors that are each able to improve mechanical strength and reduce or prevent the generation of cracks inside, even when the thickness is reduced.

A multilayer ceramic capacitor according to a preferred embodiment of the present invention includes a multilayer body including a plurality of dielectric layers and a plurality of internal electrode layers laminated alternately in a height direction, a first main surface and a second main surface which are opposed to each other in the height direction, a first end surface and a second end surface which are opposed in a length direction orthogonal or substantially orthogonal to the height direction, and a first lateral surface and a second lateral surface which are opposed to each other in a width direction orthogonal or substantially orthogonal to the height direction and the length direction, and a pair of external electrodes respectively provided on both ends of the multilayer body in the length direction to be spaced apart from each other, wherein the plurality of internal electrode layers include first internal electrode layers which extend toward and reach the first end surface, and second internal electrode layers which extend toward and reach the second end surface, the pair of external electrodes include a first external electrode which is connected to the first internal electrode layers, and is provided on the first end surface, and at least one of a portion of the first main surface or a portion of the second main surface, and a second external electrode which is connected to the second internal electrode layers, and is provided on the second end surface, and at least one of a portion of the first main surface or a portion of the second main surface, and when a dimension in the length direction between the first end surface and the second end surface of the multilayer body is defined as l, a dimension in the width direction between the first lateral surface and the second lateral surface is defined as w, and a dimension in the height direction between the first main surface and the second main surface is defined as t, a dimensional relationship $w>l>t$ is satisfied, the first internal electrode layers each include a first counter electrode portion which is located inside the multilayer body and is opposed to the second internal electrode layer, and a first extension portion which has a larger dimension in the width direction than the first counter electrode portion and is exposed at the first end surface, a portion of the first lateral surface, and a portion of the second lateral surface, and the second internal electrode layers each include a second counter electrode portion which is located inside the multilayer body and is opposed to the first internal electrode layer, and a second extension portion which has a larger dimension in the width direction than the second counter electrode portion and is exposed at the second end surface, a portion of the first lateral surface, and a portion of the second lateral surface, and when a dimension in the length direction of each of lateral surface exposed portions, which are exposed at a portion of the first lateral surface and a portion of the second lateral surface, of the first extension portion and the second extension portion is defined as e1, the dimension e1 is about 10% or more and about 44% or less with respect to the dimension in the length direction of the multilayer body, and when a dimension in the length direction from a tip adjacent to the second end surface to an end adjacent to the first end surface of the first external electrode provided on at least one of a portion of the first main surface or a portion of the second main surface, and a dimension in the length direction from a tip adjacent to the first end surface to an end adjacent to the second end surface of the second external electrode provided on at least one of a portion of the first main surface or a portion of the second main surface are each defined as e2, the dimension e2 is about 17% or more and about 48% or less with respect to the dimension in the length direction of the multilayer body.

According to preferred embodiments of the present invention, it is possible to provide LW reversed multilayer ceramic capacitors that are each able to improve mechanical strength and reduce or prevent the generation of cracks inside, even when the thickness is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
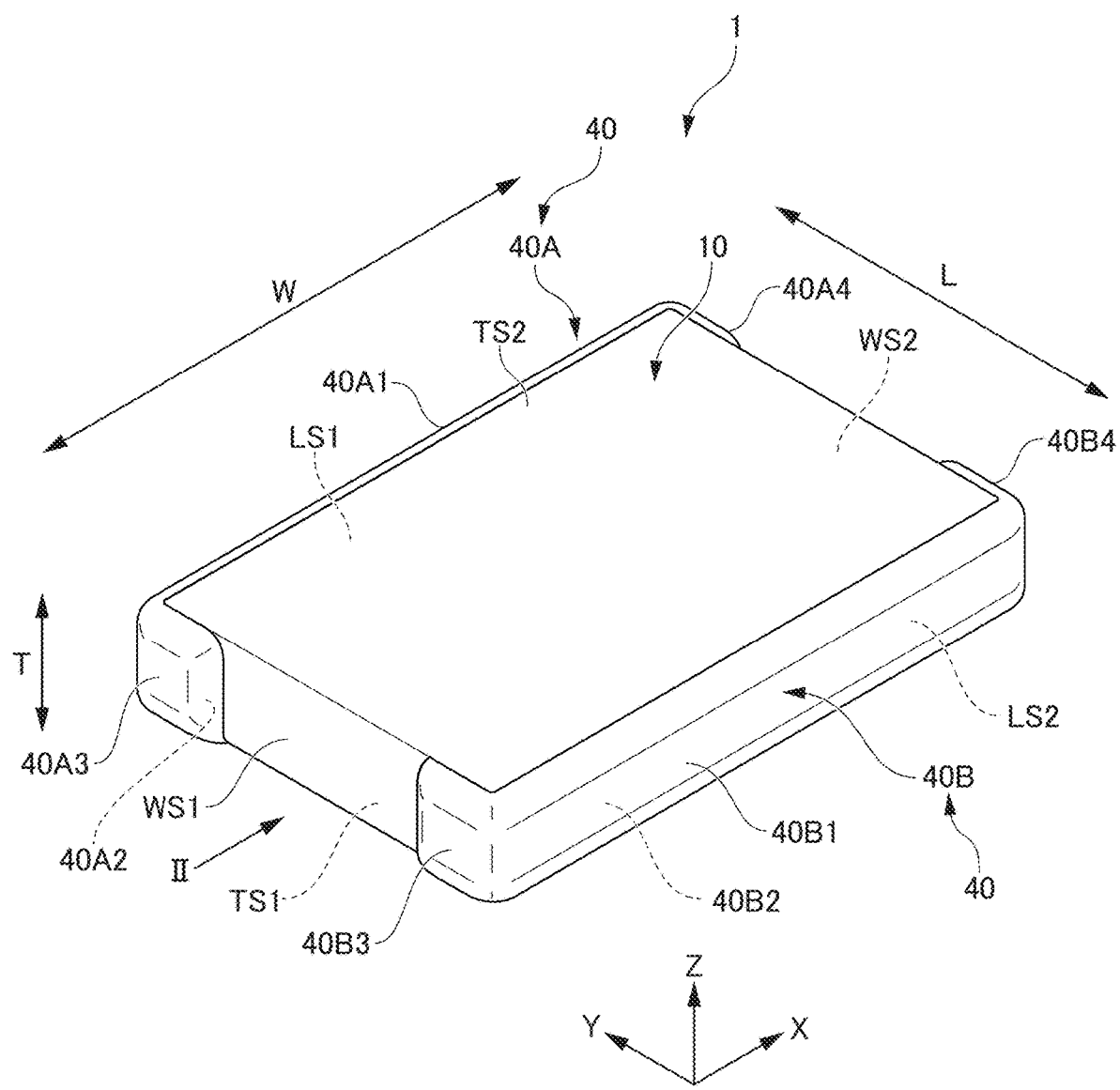
FIG. 1 is an external perspective view of a multilayer ceramic capacitor according to a preferred embodiment of the present invention.
Figure 2:
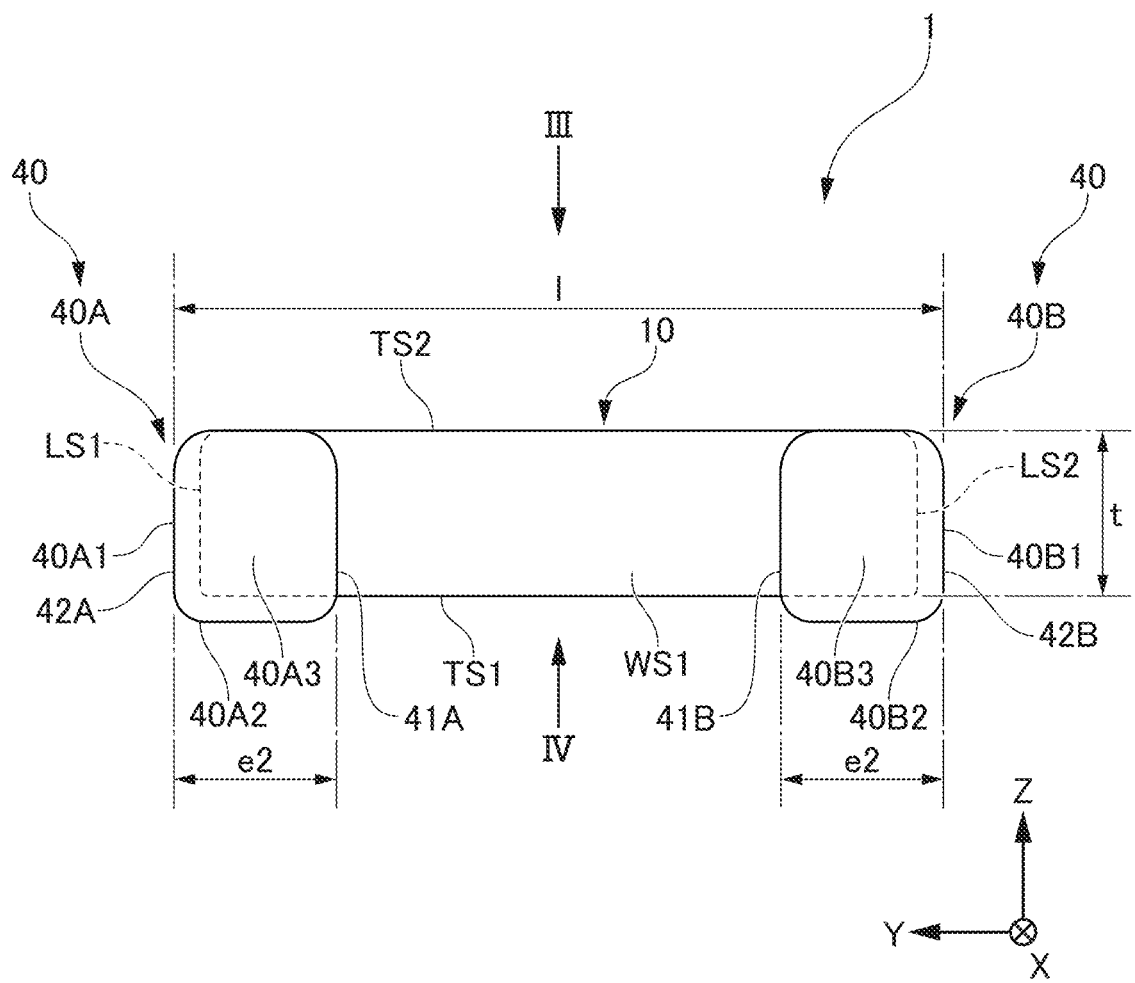
FIG. 2 is a view taken in the direction of the arrow II in FIG. 1.
Figure 3:
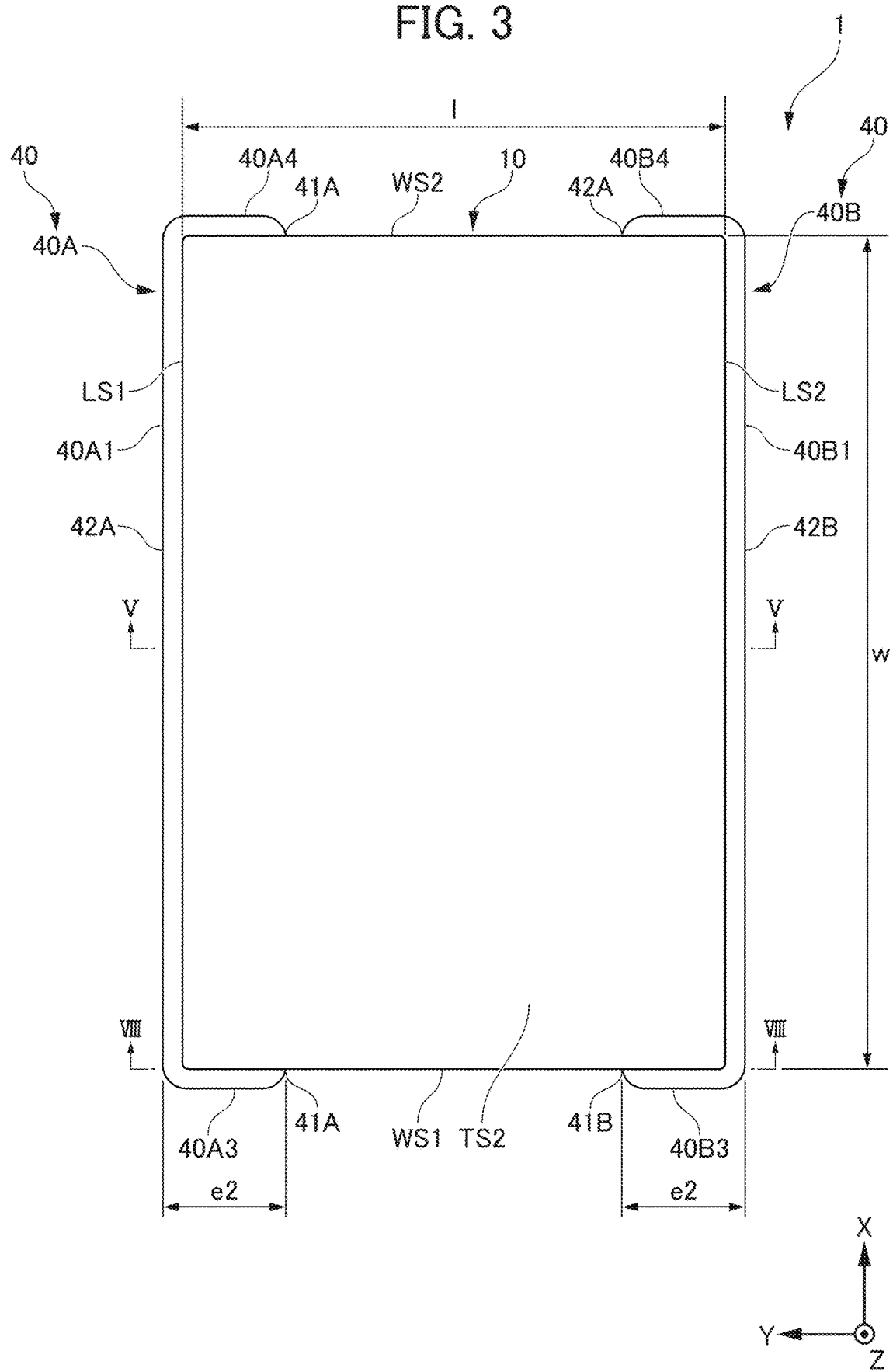
FIG. 3 is a view taken in the direction of the arrow III in FIG. 2.
Figure 4:
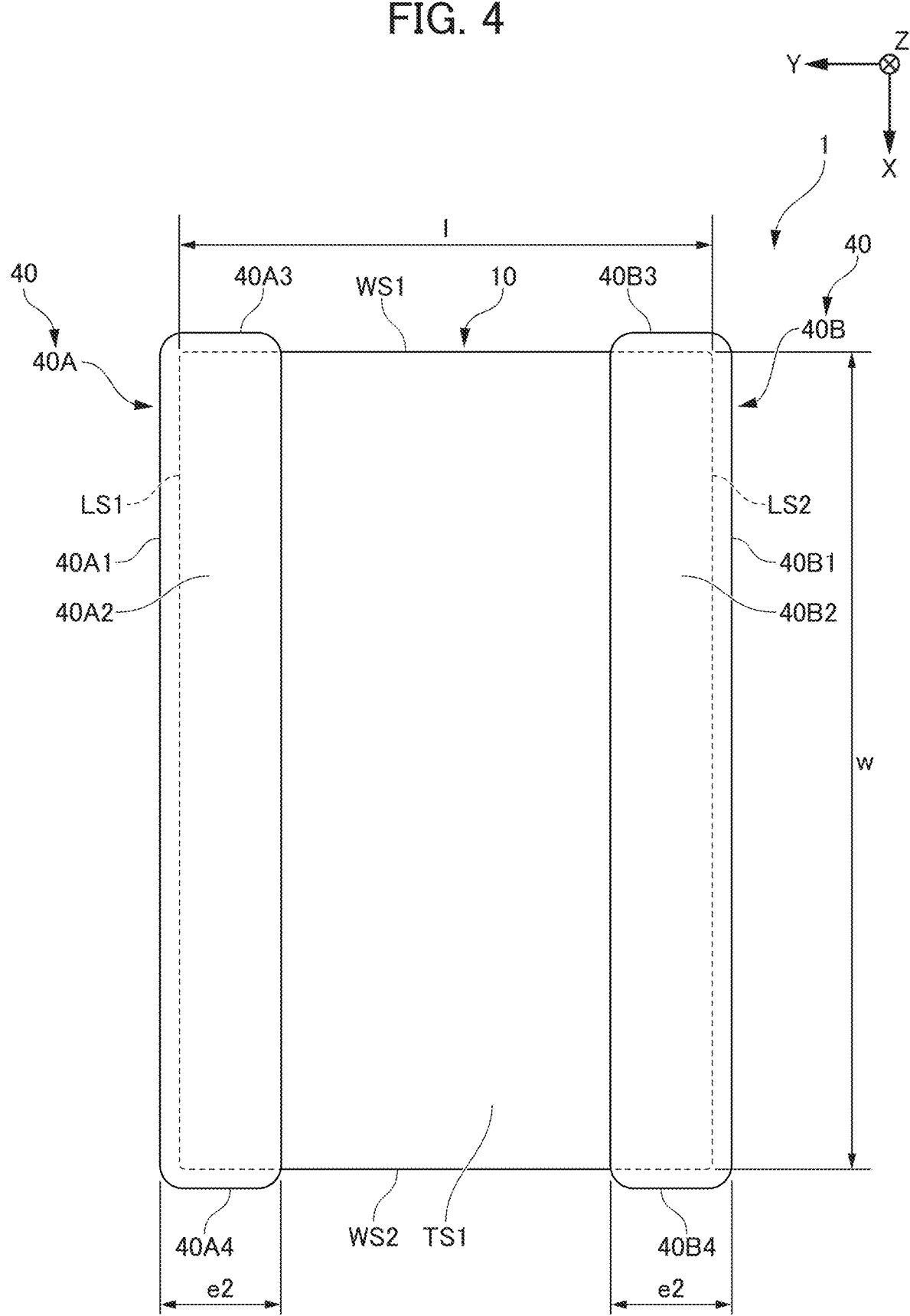
FIG. 4 is a view taken in the direction of the arrow IV in FIG. 2.
Figure 5:
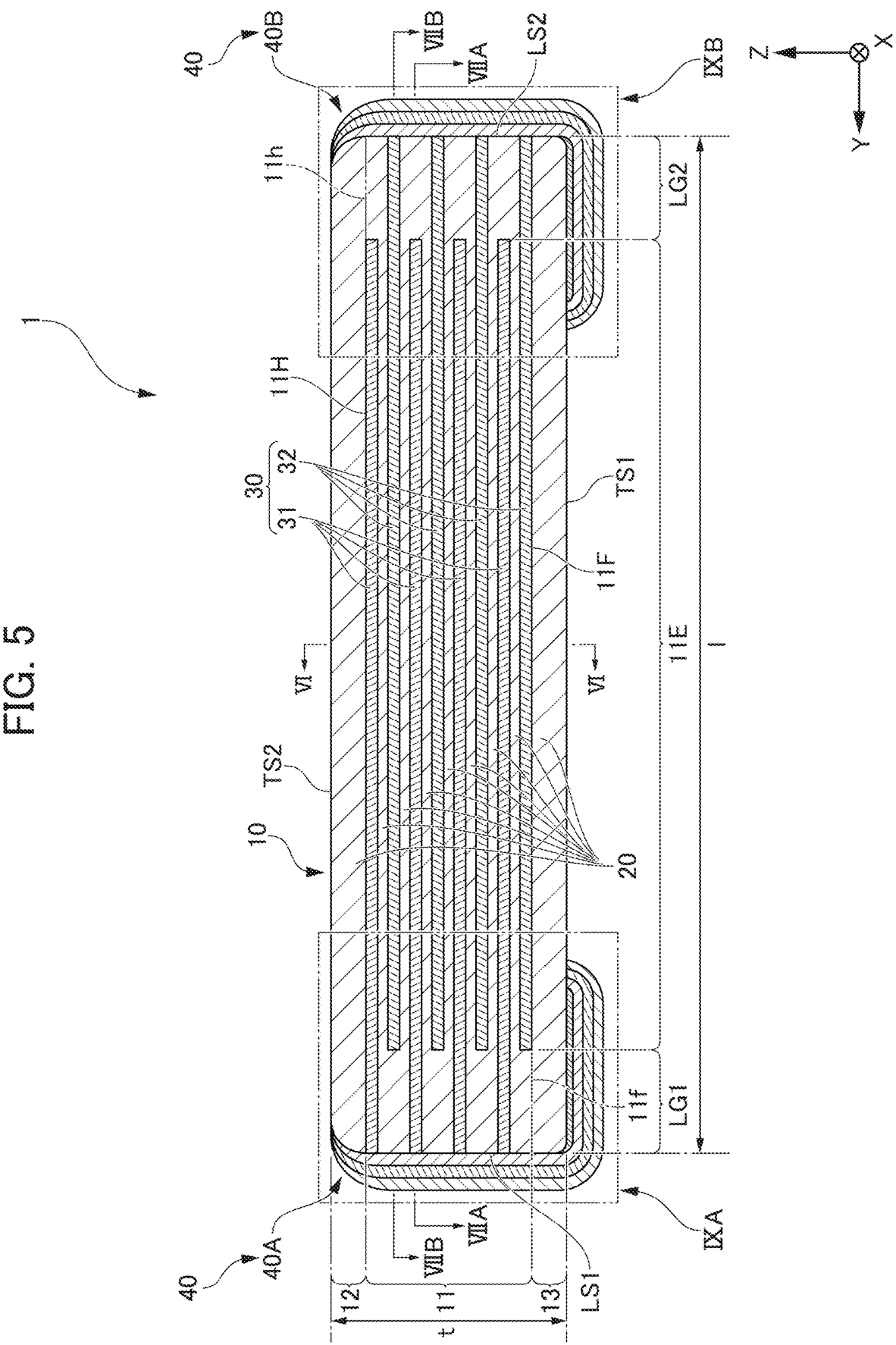
FIG. 5 is a cross-sectional view taken along the line V-V in FIG. 3.
Figure 6:
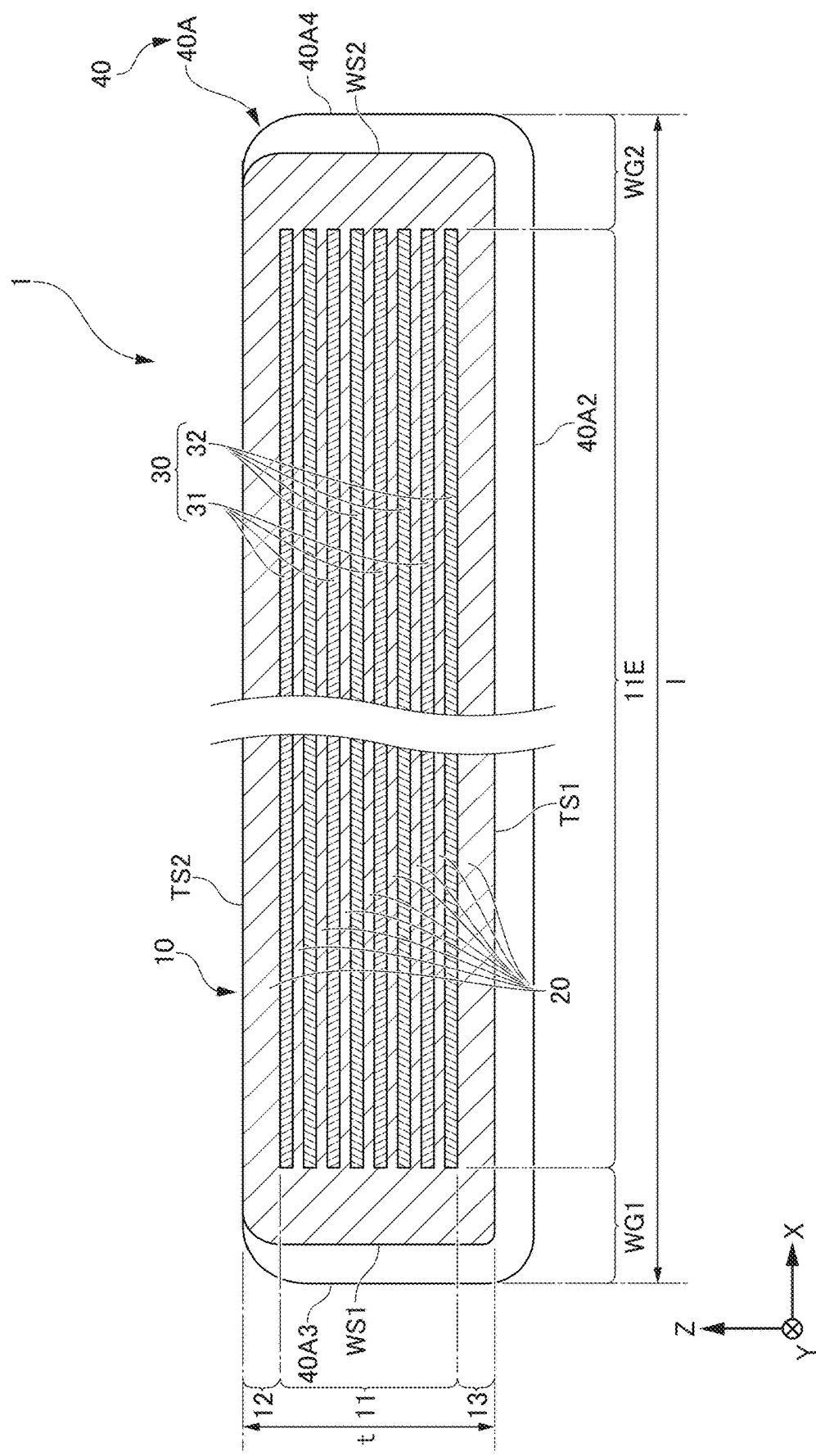
FIG. 6 is a cross-sectional view taken along the line VI-VI in FIG. 5.
Figure 7A:
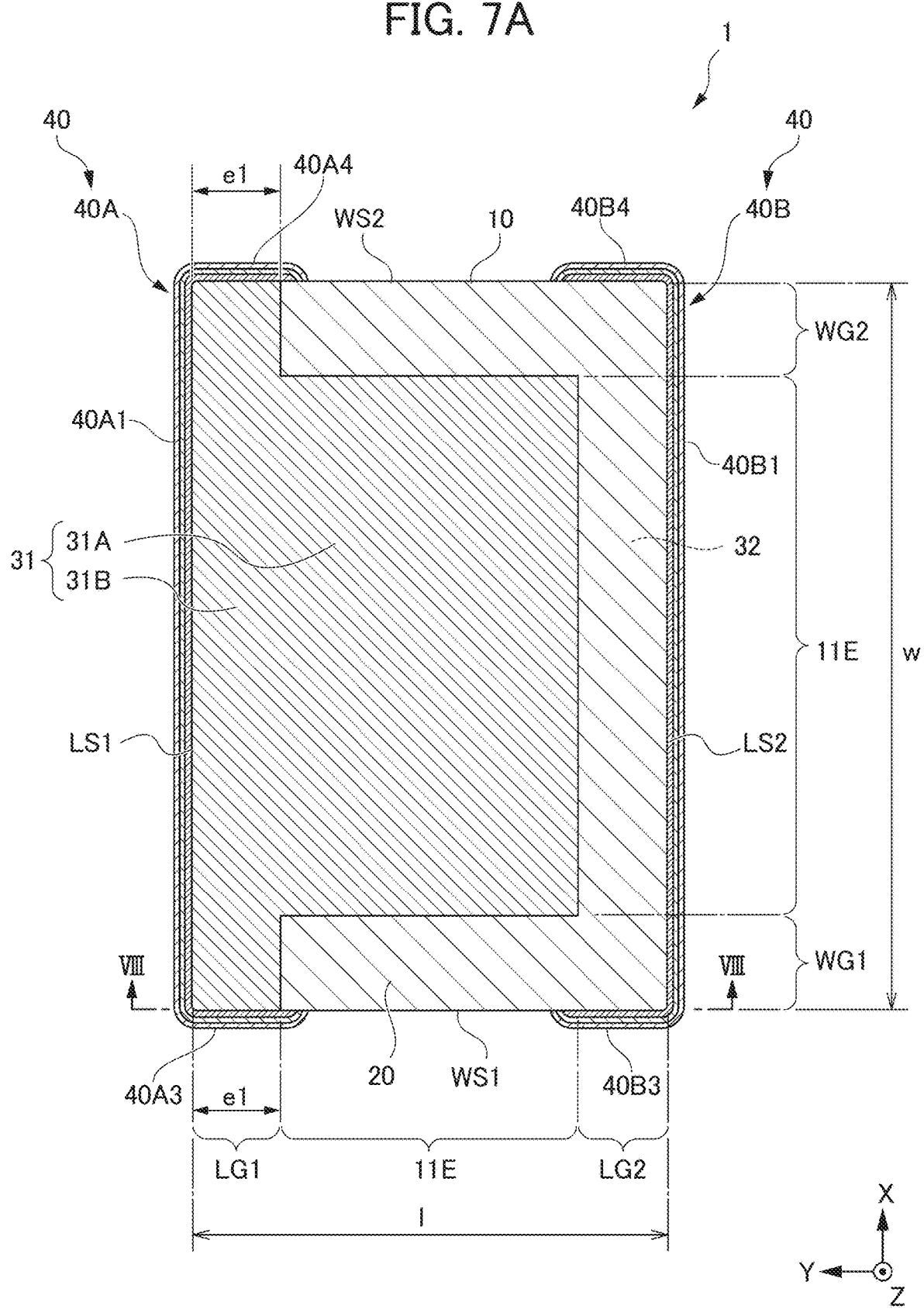
FIG. 7A is a cross-sectional view taken along the line VIIA-VIIA in FIG. 5.
Figure 7B:
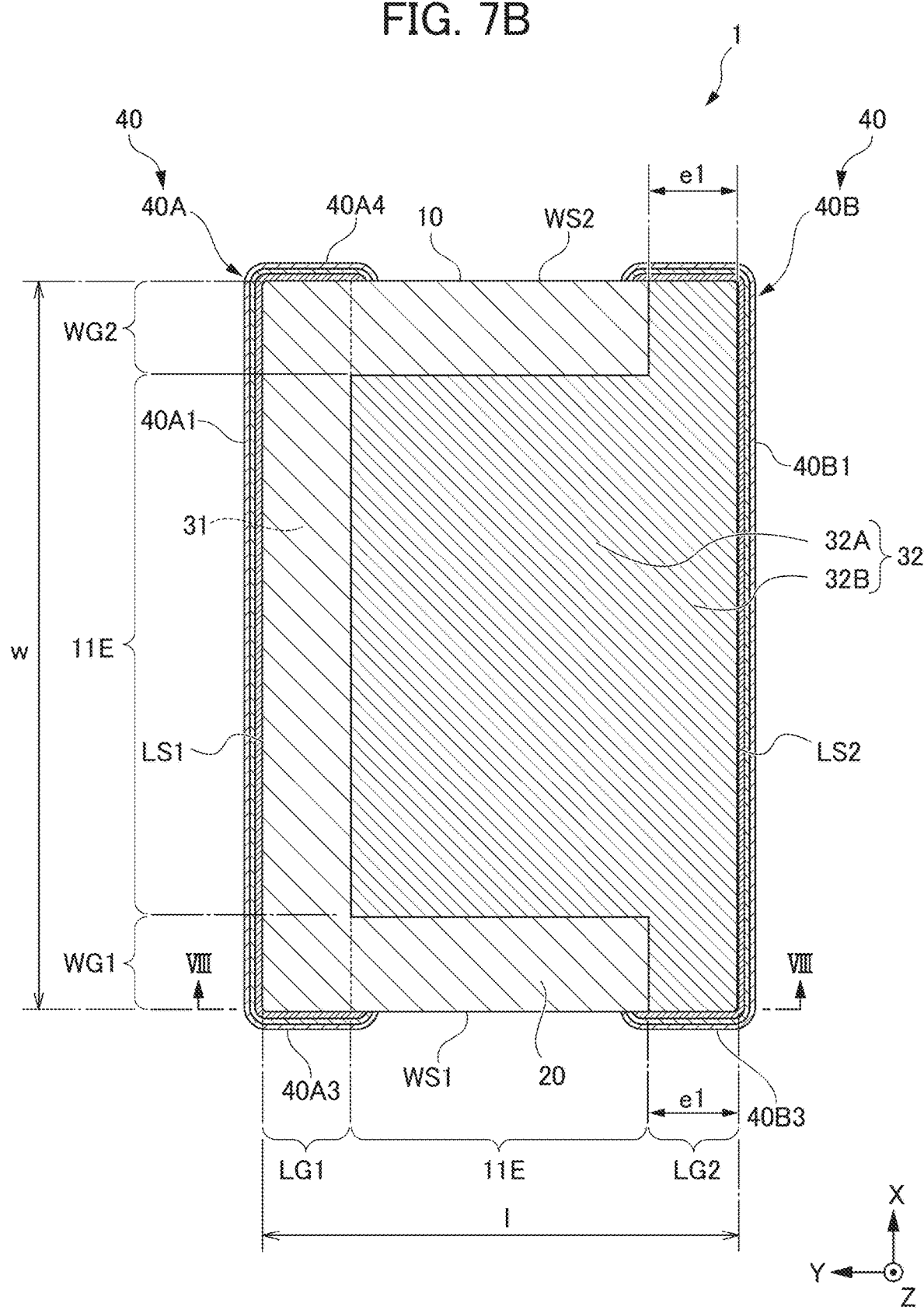
FIG. 7B is a cross-sectional view taken along the line VIIB-VIIB in FIG. 5.
Figure 8:
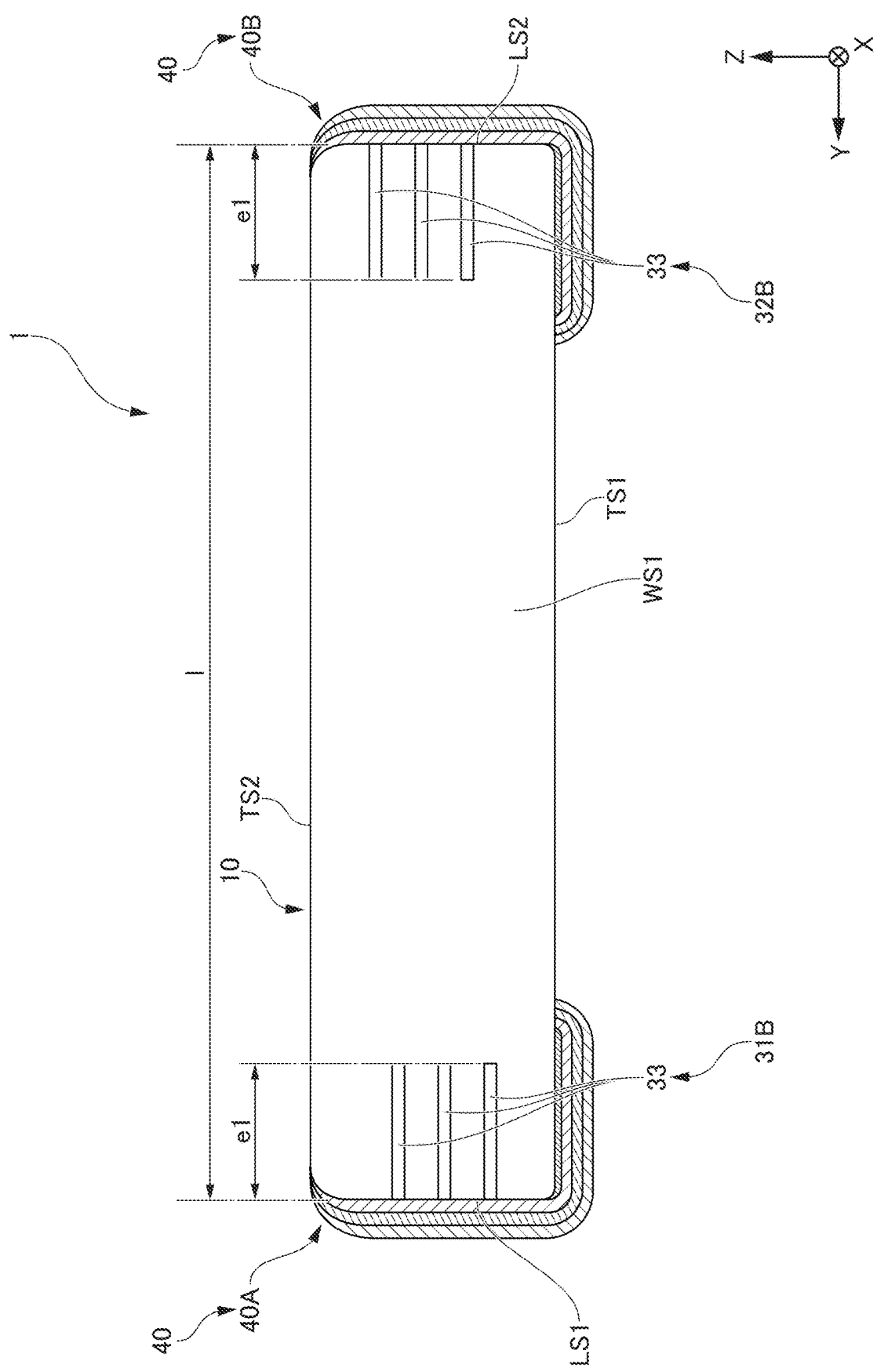
FIG. 8 is a cross-sectional view taken along the line VIII-VIII in FIG. 3.
Figure 9A:
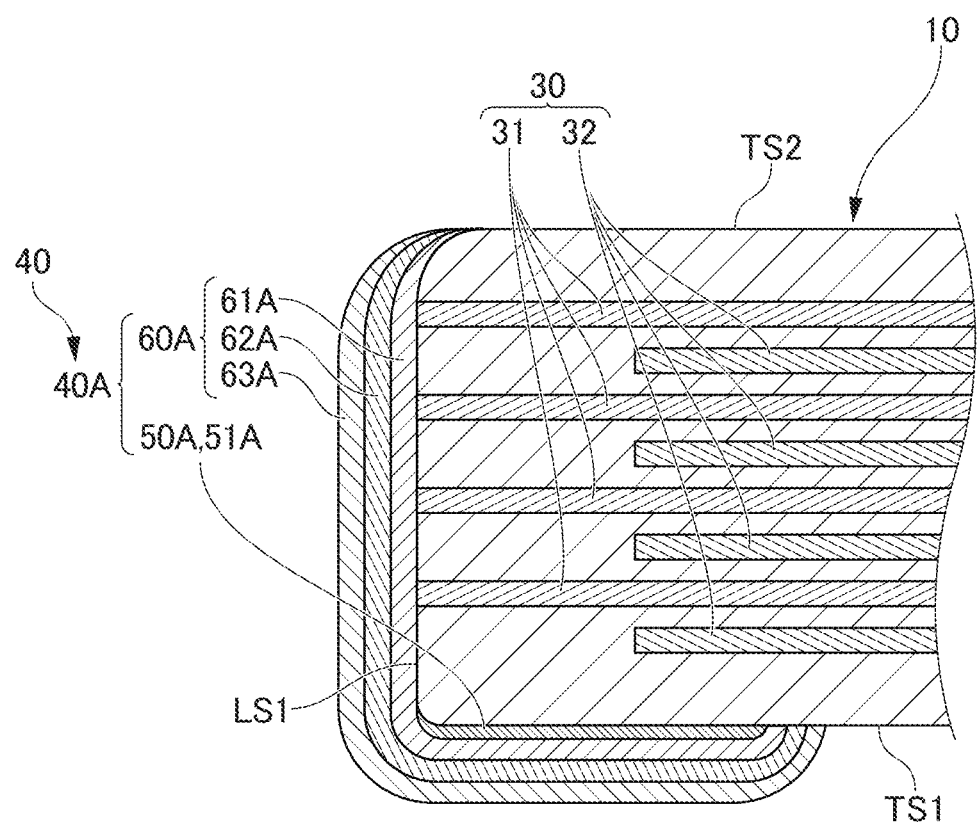
FIG. 9A is an enlarged view of a portion indicated by IXA in FIG. 5.
Figure 9B:
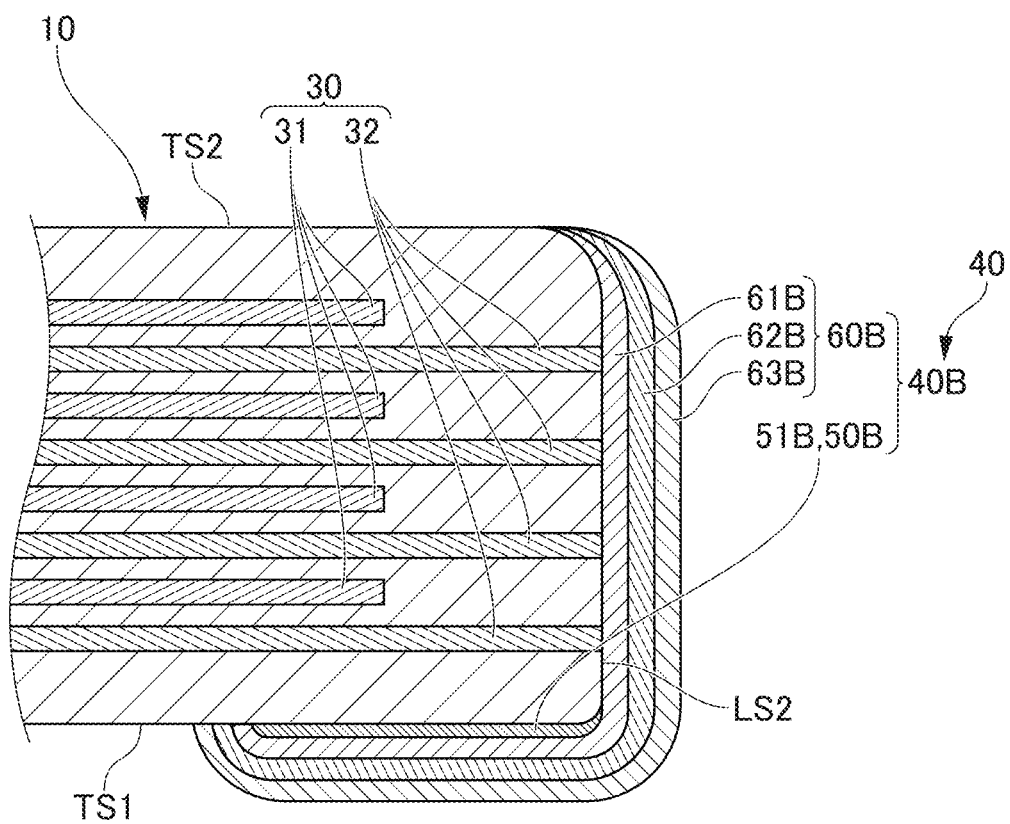
FIG. 9B is an enlarged view of a portion indicated by IXB in FIG. 5.

Hereinafter, multilayer ceramic capacitors according to preferred embodiments of the present invention will be described with reference to the drawings. However, the present invention is not limited to the following preferred embodiments, and can be applied by modifying where appropriate within a scope not changing the gist of the present invention. It should be noted that preferred embodiments of the present invention also include combinations of two or more of the individual preferred embodiments described below. FIG. 1 is an external perspective view of a multilayer ceramic capacitor 1 according to a preferred embodiment of the present invention. FIG. 2 is a view taken in the direction of the arrow II in FIG. 1. FIG. 3 is a view taken in the direction of the arrow III in FIG. 2. FIG. 4 is a view taken in the direction of the arrow IV in FIG. 2. FIG. 5 is a cross-sectional view taken along the line V-V in FIG. 3. FIG. 6 is a cross-sectional view taken along the line VI-VI in FIG. 5. FIG. 7A is a cross-sectional view taken along the line VIIA-VIIA in FIG. 5. FIG. 7B is a cross-sectional view taken along the line VIIB-VIIB in FIG. 5. FIG. 8 is a cross-sectional view taken along the line VIII-VIII in FIG. 3. FIG. 9A is an enlarged view of a portion indicated by IXA in FIG. 5. FIG. 9B is an enlarged view of a portion indicated by IXB in FIG. 5.

As shown in FIG. 1, the multilayer ceramic capacitor 1 according to the present preferred embodiment has a rectangular parallelepiped shape or a substantially rectangular parallelepiped shape. The multilayer ceramic capacitor 1 includes a multilayer body 10 having a rectangular parallelepiped shape or a substantially rectangular parallelepiped shape, and a pair of external electrodes 40 provided at both end portions of the multilayer body 10 to be spaced apart from each other.

In FIG. 1, the arrow T indicates a height direction of the multilayer ceramic capacitor 1 and the multilayer body 10. The height direction T is also referred to as the thickness direction of the multilayer ceramic capacitor 1 and the multilayer body 10. In FIG. 1, the arrow L indicates a length direction orthogonal or substantially orthogonal to the height direction T of the multilayer ceramic capacitor 1 and the multilayer body 10. In FIG. 1, the arrow W indicates a width direction orthogonal or substantially orthogonal to the height direction T and the length direction L of the multilayer ceramic capacitor 1 and the multilayer body 10. The pair of external electrodes 40 is provided at one end and the other end of the multilayer body 10 in the length direction L.

FIGS. 1 to 8 show an XYZ Cartesian coordinate system. The length direction L of the multilayer ceramic capacitor 1 and the multilayer body 10 corresponds to the Y direction. The width direction W of the multilayer ceramic capacitor 1 and the multilayer body 10 corresponds to the X direction. The height direction T of the multilayer ceramic capacitor 1 and the multilayer body 10 corresponds to the Z direction. Here, the cross section shown in FIG. 5 is also referred to as an LT cross section. The cross section shown in FIG. 6 is also referred to as a WT cross section. The cross section shown in FIGS. 7A and 7B is also referred to as an LW cross section. Furthermore, FIG. 14, FIG. 15, FIG. 17, and FIG. 18, which will be described later, similarly each show the XYZ Cartesian coordinate system.

Multilayer Body

As shown in FIGS. 1 to 6, the multilayer body 10 includes a first main surface TS1 and a second main surface TS2 which are opposed to each other in the height direction T, a first end surface LS1 and a second end surface LS2 which are opposed to each other in the length direction L orthogonal or substantially orthogonal to the height direction T, and a first lateral surface WS1 and a second lateral surface WS2 which are opposed to each other in the width direction W orthogonal or substantially orthogonal to the height direction T and the length direction L.

The distance between the first main surface TS1 and the second main surface TS2 of the multilayer body 10 refers to the dimension in the height direction T of the multilayer body 10. Hereinafter, the dimension in the height direction T of the multilayer body 10 may be referred to as "t" or "dimension t". The distance between the first end surface LS1 and the second end surface LS2 of the multilayer body 10 refers to the dimension in the length direction L of the multilayer body 10. Hereinafter, the dimension in the length direction L of the multilayer body 10 may be referred to as "l" or "dimension l". The distance between the first lateral surface WS1 and the second lateral surface WS2 of the multilayer body 10 refers to the dimension in the width direction W of the multilayer body 10. Hereinafter, the dimension of the multilayer body 10 in the width direction W may be referred to as "w" or "dimension w".

The multilayer body 10 preferably includes rounded corner portions and ridge portions. The corner portions are portions where the three surfaces of the multilayer body 10 intersect, and the ridge portions are portions where the two surfaces of the multilayer body 10 intersect. Irregularities or the like may be provided on a portion or all of the surface of the multilayer body 10, for example.

As shown in FIGS. 5 and 6, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30 alternately laminated in the height direction T. The height direction T is referred to as the lamination (stacking) direction of the plurality of dielectric layers 20 and the plurality of internal electrode layers 30, and also referred to as the thickness direction of the multilayer ceramic capacitor 1 and the multilayer body 10.

The inner layer portion 11 includes the internal electrode layers 30 from the internal electrode layer 30 located closest to the first main surface TS1 to the internal electrode layer 30 located closest to the second main surface TS2 in the height direction T. In the inner layer portion 11, the plurality of internal electrode layers 30 are opposed to each other with a dielectric layer 20 interposed therebetween. The inner layer portion 11 generates capacitance, and defines and functions as a capacitor. The inner layer portion 11 is also referred to as an active layer portion.

The plurality of dielectric layers 20 are made of a dielectric material. The dielectric material is, for example, a ceramic material. The dielectric material may be, for example, a dielectric ceramic including components such as $BaTiO_3$, $CaTiO_3$, $SrTiO_3$, or $CaZrO_3$. When these components are main components, a subcomponent having a content smaller than that of the main component, such as a Mn compound, an Fe compound, a Cr compound, a Co compound, or a Ni compound, may be added depending on the desired characteristics of the multilayer body.

The thickness, which is the dimension t, of the dielectric layer 20, is preferably about 0.4 μm or more and about 2 μm or less, for example. The number of laminated dielectric layers 20 is preferably 10 or more and 200 or less, for example. The number of the dielectric layers 20 is the total number of dielectric layers in the inner layer portion 11 and the number of dielectric layers in the first main surface-side outer layer portion 12 and the second main surface-side outer layer portion 13.

The plurality of internal electrode layers 30 includes a plurality of first internal electrode layers 31 and a plurality of second internal electrode layers 32. The first internal electrode layer 31 and the second internal electrode layer 32 are alternately provided in the height direction T with the dielectric layer 20 interposed therebetween. The first internal electrode layer 31 extends toward and reaches the first end surface LS1. The second internal electrode layer 32 extends toward and reaches the second end surface LS2. In the following description, when it is not necessary to distinguish between the first internal electrode layer 31 and the second internal electrode layer 32, the first internal electrode layer 31 and the second internal electrode layer 32 may be collectively referred to as an internal electrode layer 30.

As shown in FIG. 7A, the first internal electrode layer 31 includes a first counter electrode portion 31A and a first extension portion 31B. The first counter electrode portion 31A is a region opposed to the second internal electrode layer 32 with the dielectric layer 20 interposed therebetween, and is positioned inside the multilayer body 10. The first extension portion 31B is a portion extending from the first counter electrode portion 31A to the first end surface LS1, a portion of the first lateral surface WS1, and a portion of the second lateral surface WS2. The first extension portion 31B is connected to the first counter electrode portion 31A, and is exposed at the first end surface LS1, a portion of the first lateral surface WS1, and a portion of the second lateral surface WS2.

As shown in FIG. 7B, the second internal electrode layer 32 includes a second counter electrode portion 32A and a second extension portion 32B. The second counter electrode portion 32A is a region opposed to the first internal electrode layer 31 with the dielectric layer 20 interposed therebetween, and is positioned inside the multilayer body 10. The second extension portion 32B is a portion extending from the second counter electrode portion 32A to the second end surface LS2, a portion of the first lateral surface WS1, and a portion of the second lateral surface WS2. The second extension portion 32B is connected to the second counter electrode portion 32A, and is exposed to the second end surface LS2, a portion of the first lateral surface WS1, and a portion of the second lateral surface WS2.

FIG. 8 is a cross-sectional view taken along the line XIII-XIII of the multilayer ceramic capacitor 1 shown in FIG. 3, and shows the first lateral surface WS1 of the multilayer body 10. FIGS. 7A and 7B also show the position of the cross-sectional view of FIG. 8 taken along the line XIII-XIII. As shown in FIG. 8, the first extension portions 31B of the first internal electrode layers 31 and the second extension portions 32B of the second internal electrode layers 32 are exposed at the first lateral surface WS1 of the multilayer body 10.

Although not shown, similarly to the first lateral surface WS1 side, the first extension portions 31B of the first internal electrode layers 31 and the second extension portions 32B of the second internal electrode layers 32 are also exposed at the second lateral surface WS2 side.

With such a configuration, since it is possible to shorten the distance between the first extension portion 31B of the first internal electrode layer 31 and the second extension portion 32B of the second internal electrode layer 32, it is possible to shorten the path through which current flows. Therefore, it is possible to reduce ESL.

Hereinafter, the portions of the first extension portions 31B and the second extension portions 32B partially exposed at the first lateral surface WS1, and the portions of the first extension portion 31B and the second extension portion 32B partially exposed at the second lateral surface WS2 may be collectively referred to as lateral surface exposed portions 33 of the internal electrode layer 30. The dimension of the lateral surface exposed portion 33 in the length direction L may be referred to as e1 or dimension e1.

In the present preferred embodiment, the first counter electrode portion 31A and the second counter electrode portion 32A are opposed to each other with the dielectric layer 20 interposed therebetween, such that capacitance is generated, and characteristics of the capacitor are developed.

The shapes of the first counter electrode portion 31A and the second counter electrode portion 32A are not particularly limited, but are preferably rectangular or substantially rectangular. However, the corner portions of the rectangular shape may be rounded, or the corner portions of the rectangular shape may be formed obliquely.

The shapes of the first extension portion 31B and the second extension portion 32B are not particularly limited, but are preferably rectangular or substantially rectangular. However, the corner portions of the rectangular shape may be rounded, or the corner portions of the rectangular shape may be formed obliquely.

The dimension of the first extension portion 31B in the width direction W is larger than the dimension of the first counter electrode portion 31A in the width direction. The dimension of the second extension portion 32B in the width direction W is larger than the dimension of the second counter electrode portion 32A in the width direction. With such a configuration, it is possible not only to improve the strength of the multilayer ceramic capacitor 1, but also to reduce ESL of the multilayer ceramic capacitor 1 because the current path becomes wide by increasing the contact area between the internal electrode layer 30 and the external electrode 40.

The dimension e1 in the length direction of each lateral surface exposed portion 33 of the first extension portion 31B of the first internal electrode layer 31 and the second extension portion 32B of the second internal electrode layer 32 is preferably about 10% or more and about 44% or less with respect to the dimension l in the length direction L of the multilayer body 10, for example.

When the dimension e1 is about 10% or more and about 44% or less with respect to the dimension l in the length direction L of the multilayer body 10, it is possible to improve the area of the internal electrode layer 30 in the multilayer body 10 even in the case of the LW reversed multilayer ceramic capacitor 1. Therefore, it is possible to increase the area ratio of the internal electrode layer 30 having higher strength than the portions of the dielectric layer 20. As a result, it is possible to improve the strength of the multilayer ceramic capacitor 1, and it is possible to reduce or prevent the generation of cracks in the multilayer ceramic capacitor 1. More specifically, it is possible to improve the compression stress by increasing the total amount of the internal electrode layer 30 when the pattern of the internal electrode layer 30 is sintered to form the internal electrode layer 30 at the time of manufacturing the multilayer ceramic capacitor 1. As a result, resistance to external stress is increased, such that it is possible to improve the strength of the multilayer ceramic capacitor 1.

When the dimension e1 is smaller than about 10% with respect to the dimension in the length direction L of the multilayer body 10, the area of the internal electrode layer 30 in the multilayer body 10 cannot be sufficiently increased, and it is difficult to secure the mechanical strength. Therefore, when stress is applied from the outside, cracks may be generated in the multilayer ceramic capacitor 1. Furthermore, when the dimension e1 is larger than about 44% with respect to the dimension in the length direction L of the multilayer body 10, since the distance in the length direction L between the first external electrode 40A and the second external electrode 40B becomes short, migration may occur and moisture resistance may be lowered.

More specifically, the dimension e1 in the length direction L of each of the lateral surface exposed portions 33 in the plurality of first extension portions 31B is preferably about 30 μm or more and about 230 μm or less, for example. More specifically, the dimension e1 in the length direction L of each of the lateral surface exposed portions 33 in the plurality of second extension portions 32B is preferably about 30 μm or more and about 230 μm or less, for example.

The dimension e1 can be measured, for example, by the following method. The first main surface TS1 of the multilayer body 10 is polished to a position in the middle of the height direction T, i.e., to a position of t/2 in the height direction and to become parallel to the LW cross section. Then, the lateral surface exposed portion 33 adjacent to the first lateral surface WS1 and the lateral surface exposed portion 33 adjacent to the second lateral surface WS2 of the first extension portion 31B, and the lateral surface exposed portion 33 adjacent to the first lateral surface WS1 and the lateral surface exposed portion 33 adjacent to the second lateral surface WS2 of the second extension portion 32B in the LW cross section exposed by polishing are respectively measured using a microscope. Then, the average value of the four measured values is defined as a dimension e1 in the length direction L of the lateral surface exposed portion 33 of the multilayer ceramic capacitor 1.

The multilayer body 10 includes a counter electrode portion 11E. As shown in FIGS. 5 to 7B, the counter electrode portion 11E is a portion where the first counter electrode portion 31A of the first internal electrode layer 31 and the second counter electrode portion 32A of the second internal electrode layer 32 are opposed to each other. The counter electrode portion 11E functions as a portion of the inner layer portion 11. In addition, the counter electrode portion 11E is also referred to as a capacitor effective portion.

The first internal electrode layer 31 and the second internal electrode layer 32 are made of an appropriate electrically conductive material such as a metal such as Ni, Cu, Ag, Pd, or Au, or an alloy containing at least one of these metals. When an alloy is used, the first internal electrode layer 31 and the second internal electrode layer 32 may be made of, for example, an Ag—Pd alloy.

The thicknesses of the first internal electrode layer 31 and the second internal electrode layer 32 are preferably, for example, about 0.2 μm or more and about 2.0 μm or less. The total number of the first internal electrode layer 31 and the second internal electrode layer 32 is preferably 15 or more and 200 or less, for example.

As shown in FIGS. 5 and 6, the first main surface-side outer layer portion 13 is positioned adjacent to the first main surface TS1. The first main surface-side outer layer portion 13 is positioned between the first main surface TS1 and a first outermost surface 11F which is the outermost surface on the first main surface TS1 of the inner layer portion 11 and an extended surface 11f of the first outermost surface 11F. The second main surface-side outer layer portion 12 is positioned adjacent to the second main surface TS2. The second main surface-side outer layer portion 12 is positioned between the second main surface TS2 and a second outermost surface 11H which is the outermost surface on the second main surface TS2 of the inner layer portion 11 and an extended surface 11h of the first outermost surface 11H. Each of the first main surface-side outer layer portion 12 and the second main surface-side outer layer portion 13 is an aggregate of a plurality of dielectric layers 20. The dielectric layers 20 used in the first main surface-side outer layer portion 12 and the second main surface-side outer layer portion 13 may be the same as the dielectric layers 20 used in the inner layer portion 11.

The thickness of either or both of the first main surface-side outer layer portion 12 and the second main surface-side outer layer portion 13, i.e., the dimension in the height direction T, is preferably about 15% or more and about 35% or less the thickness of the inner layer portion 11, for example. This makes it possible to secure the capacitance and improve the strength of the multilayer ceramic capacitor 1.

The thicknesses of the inner layer portion 11, the first main surface-side outer layer portion 12, and the second main surface-side outer layer portion 13 can be measured, for example, by the following method. The first lateral surface is polished until the dimension of the multilayer ceramic capacitor 1 in the width direction W becomes about ½ to expose the LT cross section at the center in the width direction W. Then, the thicknesses of the inner layer portion 11, the first main surface-side outer layer portion 12, and the second main surface-side outer layer portion 13 in the LT cross section are measured using a microscope.

The multilayer body 10 includes end surface-side outer layer portions. As shown in FIGS. 5, 7A and 7B, the end surface-side outer layer portions include a first end surface-side outer layer portion LG1 positioned adjacent to the first end surface LS1 and a second end surface-side outer layer portion LG2 positioned adjacent to the second end surface LS2. The first end surface-side outer layer portion LG1 is a portion including the dielectric layers 20 and the first extension portions 31B positioned between the counter electrode portion 11E and the first end surface LS1. That is, the first end surface-side outer layer portion LG1 is an aggregate of the portions of the plurality of dielectric layers 20 adjacent to the first end surface LS1 and the plurality of first extension portions 31B. The second end surface-side outer layer portion LG2 is a portion including the dielectric layers 20 and the second extension portions 32B positioned between the counter electrode portion 11E and the second end surface LS2. That is, the second end surface-side outer layer portion LG2 is an aggregate of the portions of the plurality of dielectric layers 20 adjacent to the second end surface LS2 and the plurality of second extension portions 32B. The first end surface-side outer layer portion LG1 and the second end surface-side outer layer portion LG2 are also referred to as an L gap or an end gap.

The multilayer body 10 includes lateral surface-side outer layer portions. As shown in FIGS. 6, 7A and 7B, the lateral surface-side outer layer portion includes a first lateral surface-side outer layer portion WG1 positioned adjacent to the first lateral surface WS1 and a second lateral surface-side outer layer portion WG2 positioned adjacent to the second lateral surface WS2. The first lateral surface-side outer layer portion WG1 is a portion including the dielectric layers 20 positioned between the counter electrode portion 11E and the first lateral surface WS1. That is, the first lateral surface-side outer layer portion WG1 is an aggregate of portions of the plurality of dielectric layers 20 adjacent to the first lateral surface WS1. The second lateral surface-side outer layer portion WG2 is a portion including the dielectric layers 20 positioned between the counter electrode portion 11E and the second lateral surface WS2. That is, the second lateral surface-side outer layer portion WG2 is an aggregate of portions of the plurality of dielectric layers 20 adjacent to the second lateral surface WS2. The first lateral surface-side outer layer portion WG1 and the second lateral surface-side outer layer portion WG2 are also referred to as a W gap or a side gap.

As shown in FIGS. 4 to 7B, when the dimension in the length direction L between the first end surface LS1 and the second end surface LS2 of the multilayer body 10 is defined as l, the dimension in the width direction W between the first lateral surface WS1 and the second lateral surface WS2 is defined as w, and the dimension in the height direction T between the first main surface TS1 and the second main surface TS2 is defined as t, these dimensional relationships satisfy w>l>t. That is, the length l of the multilayer body 10 is smaller than the width w. With such a configuration, not only the current path between the first internal electrode layer 31 and the second internal electrode layer 32 is shortened, but also the area of the first extension portion 31B of the first internal electrode layer 31 and the area of the second extension portion 32B of the second internal electrode layer 32 can be increased. Therefore, it is possible to reduce ESL of the multilayer ceramic capacitor 1.

More specifically, the dimension l in the length direction L between the first end surface LS1 and the second end surface LS2 of the multilayer body 10 is preferably about 0.30 mm or more and about 0.60 mm or less, for example. The dimension w in the width direction W between the first lateral surface WS1 and the second lateral surface WS2 of the multilayer body 10 is preferably about 0.60 mm or more and about 1.0 mm or less, for example.

Furthermore, the dimension t in the height direction T between the first main surface TS1 and the second main surface TS2 of the multilayer body 10 is preferably about 150 µm or less, for example. This makes it possible to perform high-density mounting. Furthermore, the dimension t in the height direction T between the first main surface TS1 and the second main surface TS2 of the multilayer body 10 is preferably about 100 µm or less, for example. This enables higher density mounting.

The dimensions of l, w, and t of the multilayer body 10 can be measured, for example, by the following method.

First, the dimension w of the multilayer body 10 is measured. More specifically, the dimension w of the multilayer body 10 is measured by a microscope at a middle position in the length direction L of the multilayer body 10, i.e., at a position located at about ½ of the multilayer body 10.

Next, dimensions l and t of the multilayer body 10 are measured. First, the same multilayer body 10 as the multilayer body 10 whose dimension w is measured is polished up to a middle position in the width direction W of the multilayer body 10, i.e., at a position w/2 the multilayer body 10, and the polished surface becomes parallel to the LT cross section. Then, the LT cross section exposed by the polishing is observed with a microscope. The dimension l of the multilayer body 10 is measured by a microscope at a middle position in the height direction T of the multilayer body 10 in the LT cross section, i.e., at a position at about t/2 the multilayer body 10. The dimension t of the multilayer body 10 is measured by a microscope at a middle position in the length direction L of the multilayer body 10 in the LT cross section, i.e., at a position at about ½ the multilayer body 10.

External Electrode

As shown in FIG. 5, the external electrodes 40 includes a first external electrode 40A provided on the first end surface LS1 of the multilayer body 10 and a second external electrode 40B provided on the second end surface LS2 of the multilayer body 10. The first external electrode 40A is in contact with the first extension portion 31B of each of the plurality of first internal electrode layers 31 exposed at the first end surface LS1. With such a configuration, the first external electrode 40A is electrically connected to the plurality of first internal electrode layers 31. The second external electrode 40B is in contact with the second extension portion 32B of each of the plurality of second internal electrode layers 32 exposed at the second end surface LS2. With such a configuration, the second external electrode 40B is electrically connected to the plurality of second internal electrode layers 32.

The first external electrode 40A is provided on the first end surface LS1 and at least one of a portion of the first main surface TS1 and a portion of the second main surface TS2. As shown in FIGS. 5, 7A, and 7B, the first external electrode 40A of the present preferred embodiment is provided on the first end surface LS1, on a portion of the first main surface TS1, on a portion of the first lateral surface WS1, and on a portion of the second lateral surface WS2, and is not provided on the second main surface TS2. In the following description, when it is not necessary to distinguish between the first external electrode 40A and the second external electrode 40B, the first external electrode 40A and the second external electrode 40B may be collectively referred to as an external electrode 40.

The first external electrode 40A of the present preferred embodiment includes a first surface portion 40A1 positioned on the first end surface LS1, a second surface portion 40A2 positioned on a portion of the first main surface TS1, a third surface portion 40A3 positioned on a portion of the first lateral surface WS1, and a fourth surface portion 40A4 positioned on a portion of the second lateral surface WS2.

The first surface portion 40A1 covers the entire first end surface LS1, and is a portion connected to the first extension portion 31B of the first internal electrode layer 31. The second surface portion 40A2 is a portion connected to a land of the mounting substrate.

The third surface portion 40A3 is a portion connected to the lateral surface exposed portion 33 of the first extension portion 31B of the first internal electrode layer 31 exposed at the first lateral surface WS1. The fifth surface portion 40A5 is a portion connected to the lateral surface exposed portion 33 of the first extension portion 31B of the first internal electrode layer 31 exposed at the second lateral surface WS2.

The dimension e2 in the length direction L of the third surface portion 40A3 and the fourth surface portion 40A4 of the first external electrode 40A is preferably about 17% or more and about 48% or less with respect to the dimension l in the length direction L of the multilayer body 10, for example. As shown in FIGS. 2 and 3, the dimension e2 refers to the dimension of the first external electrode 40A from the tip 41A adjacent to the second end surface LS2 to the end 42A adjacent to the first end surface LS1.

The second external electrode 40B is provided on the second end surface LS2 and at least one of a portion of the first main surface TS1 and a portion of the second main surface TS2. As shown in FIGS. 5, 7A and 7B, the second external electrode 40B of the present preferred embodiment is provided on the second end surface LS2, on a portion of the first main surface TS1, on a portion of the first lateral surface WS1, and on a portion of the second lateral surface WS2, and is not provided on the second main surface TS2.

The second external electrode 40B of the present preferred embodiment includes a sixth surface portion 40B1 positioned on the second end surface LS2, a seventh surface portion 40B2 positioned on a portion of the first main surface TS1, an eighth surface portion 40B3 positioned on a portion of the first lateral surface WS1, and a ninth surface portion 40B4 positioned on a portion of the second lateral surface WS2.

The sixth surface portion 40B1 covers the entire second end surface LS2, and is a portion connected to the second extension portion 32B of the second internal electrode layer 32. The seventh surface portion 40B2 is a portion connected to a land of the mounting substrate.

The eighth surface portion 40B3 is a portion connected to the second extension portion 32B of the second internal electrode layer 32 exposed at the first lateral surface WS1. The tenth surface portion 40B5 is a portion connected to the second extension portion 32B of the second internal electrode layer 32 exposed at the second lateral surface WS2.

The dimension e2 in the length direction L of the eighth surface portion 40B3 and the ninth surface portion 40B4 of the second external electrode 40B is preferably about 17% or more and about 48% or less with respect to the dimension l in the length direction L of the multilayer body 10, for example. The dimension e2 refers to the dimension of the second external electrode 40B from the tip 41B adjacent to the first end surface LS1 to the end 42B adjacent to the second end surface LS2.

Since the dimension e2 of each of the first external electrode 40A and the second external electrode 40B is about 17% or more and about 48% or less with respect to the dimension l in the length direction L of the multilayer body 10, it is possible to appropriately obtain the advantageous effect of the present preferred embodiment, i.e., the advantageous effect of reducing or preventing the occurrence of cracks due to the improvement of the mechanical strength, without impairing the function of the external electrode 40.

When the dimension e2 of each of the first external electrode 40A and the second external electrode 40B is smaller than about 17% with respect to the dimension l in the length direction L of the multilayer body 10, a sufficient bonding area with respect to the mounting substrate cannot be ensured, so that the self-alignment effect is reduced, which may lead to poor mounting of the multilayer ceramic capacitor 1.

When the dimension e2 of each of the first external electrode 40A and the second external electrode 40B is larger than about 48% with respect to the dimension l in the length direction L of the multilayer body 10, the multilayer ceramic capacitor 1 may rotate at the time of mounting on the mounting substrate, and the first external electrode 40A or the second external electrode 40B may be mounted so as to straddle the two mounting lands, which may cause short circuit failure. Furthermore, since the distance in the length direction L between the first external electrode 40A and the second external electrode 40B becomes short, migration may occur and moisture resistance may be lowered.

It is to be noted that the self-alignment effect mentioned above refers to an effect that positioning is performed by moving an electronic element, which is used as a target for mounting, supported by the molten solder to be mounted by a force that reduces the surface area of the molten solder when soldering, i.e., surface tension. This self-alignment effect reduces or prevents positional displacement at the time of mounting.

More specifically, the dimension e2 of each of the first external electrode 40A and the second external electrode 40B is preferably about 50 µm or more and about 250 µm or less, for example.

The measuring method of the dimension e2 of each of the first external electrode 40A and the second external electrode 40B can be measured from the appearance using a measuring device. More specifically, the dimension e2 in the middle of the first external electrode 40A in the width direction W and the dimension e2 in the middle of the second external electrode 40B in the width direction W are measured by a measuring device, and an average value thereof is defined as e2.

As shown in FIG. 9A, the first external electrode 40A includes a first base electrode layer 50A functioning as a base electrode layer and a first plated layer 60A provided on the first base electrode layer 50A. The first base electrode layer 50A is provided on the surface of the multilayer body 10. The first plated layer 60A covers the first base electrode layer 50A.

As shown in FIG. 9B, the second external electrode 40B includes a second base electrode layer 50B functioning as a base electrode layer and a second plated layer 60B provided on the second base electrode layer 50B. The second base electrode layer 50B is provided on the surface of the multilayer body 10. The second plated layer 60B covers the second base electrode layer 50B.

The first base electrode layer 50A and the second base electrode layer 50B include at least one selected from a fired layer, a thin film layer, and the like.

In the present preferred embodiment, the first base electrode layer 50A and the second base electrode layer 50B are thin film layers. The thin film layer is a layer on which metal particles are deposited.

In a case where the first base electrode layer 50A and the second base electrode layer 50B are formed using a thin film layer, the first base electrode layer 50A and the second base electrode layer 50B are preferably formed by a thin film formation method such as a sputtering method or an evaporation method. Here, a sputtered electrode formed by a sputtering method is described.

The first base electrode layer 50A of the present preferred embodiment includes a first thin film layer 51A formed with a sputtered electrode. The second base electrode layer 50B includes a second thin film layer 51B formed with a sputtered electrode. When the first base electrode layer 50A and the second base electrode layer 50B are formed with sputtered electrodes, it is preferable to form sputtered electrodes directly on the first main surface TS1 of the multilayer body 10.

As shown in FIGS. 5 and 9A, the first thin film layer 51A formed with the sputtered electrode is provided on a portion of the first main surface TS1 adjacent to the first end surface LS1. More specifically, the first thin film layer 51A is preferably provided on the first main surface TS1 at a portion covered with the first external electrode 40A shown in FIG. 4.

Furthermore, it is preferable that the first thin film layer 51A is provided on a portion of the first main surface TS1, and slightly surrounds a portion of the first end surface LS1 continuously from the portion of the first main surface TS1.

Figure 11:
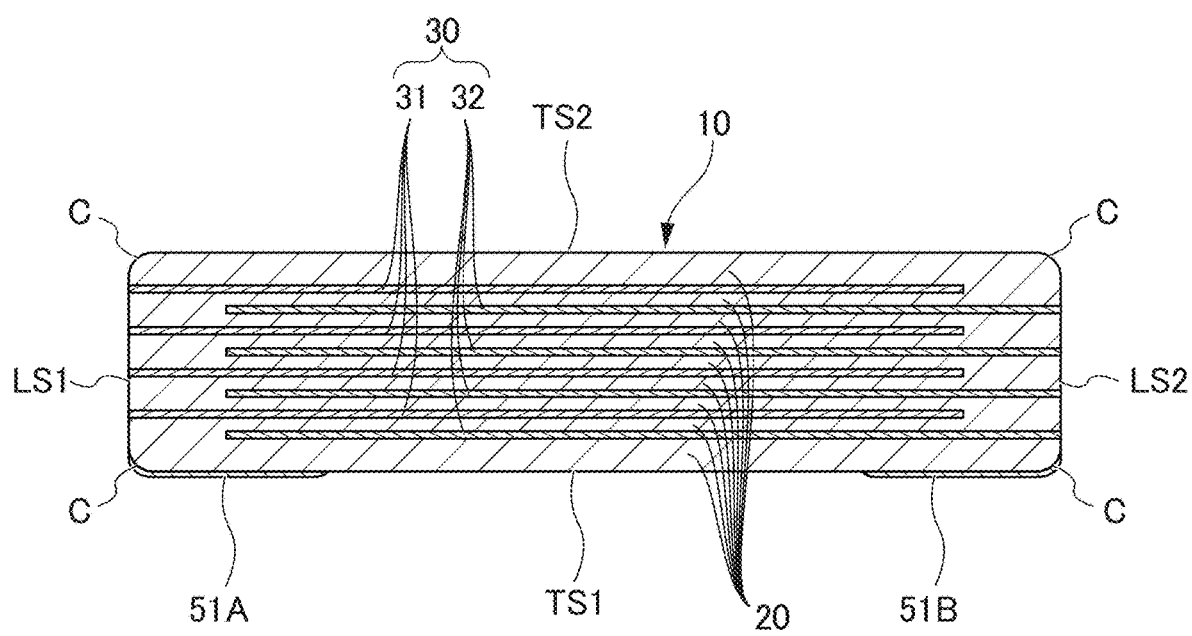
FIG. 11 is a view showing an intermediate state in the manufacturing process of the multilayer ceramic capacitor according to the above preferred embodiment of the present invention.

For example, as shown in FIG. 11 used in the explanation of the manufacturing process described later, when a chamfered portion C such as roundness is formed in the ridge line portion of the multilayer body 10, the first thin film layer 51A is preferably provided on a portion of the first main surface TS1 adjacent to the first end surface LS1 and on the chamfered portion C adjacent to the first end surface LS1 which is continuous with the portion of the first main surface TS1 adjacent to the first end surface LS1. This facilitates formation of the thin film layer by sputtering or the like.

According to the above method, when the plated layer is formed, it is possible to control the distance between the first thin film layer 51A provided on a portion of the first end surface LS1 and the internal electrode layer 30 exposed at the first end surface LS1. Therefore, it is easy to deposit a plated layer even on the surface of the multilayer body 10 between the first thin film layer 51A provided on a portion of the first end surface LS1 and the internal electrode layer 30 exposed at the first end surface LS1.

As shown in FIGS. 5 and 9B, the second thin film layer 51B formed with the sputtered electrode is provided on a portion of the first main surface TS1 adjacent to the second end surface LS2. More specifically, the second thin film layer 51B is preferably provided on the first main surface TS1 at a portion covered with the second external electrode 40B shown in FIG. 4.

Furthermore, it is preferable that the second thin film layer 51B is provided on a portion of the first main surface TS1, and slightly surrounds a portion of the second end surface LS2 continuously from the portion of the first main surface TS1.

For example, as shown in FIG. 11 used in the explanation of the manufacturing process described later, when the chamfered portion C such as roundness is formed in the ridge line portion of the multilayer body 10, the second thin film layer 51B is preferably provided on a portion of the first main surface TS1 adjacent to the second end surface LS2 and on the chamfered portion C adjacent to the second end surface LS2 which is continuous with a portion of the first main surface TS1 adjacent to the second end surface LS2. This facilitates formation of the thin film layer by sputtering or the like.

According to the above method, when the plated layer is formed, it is possible to control the distance between the second thin film layer 51B provided on a portion of the second end surface LS2 and the internal electrode layer 30 exposed at the second end surface LS2. Therefore, it is easy to deposit a plated layer even on the surface of the multilayer body 10 between the second thin film layer 51B provided on a portion of the second end surface LS2 and the internal electrode layer 30 exposed on the second end surface LS2.

The first thin film layer 51A and the second thin film layer 51B formed with sputtered electrodes preferably contain at least one metal selected from the group consisting of Mg, Al, Ti, W, Cr, Cu, Ni, Ag, Co, Mo, and V. With such a configuration, it is possible to increase the adhesive force of the external electrode 40 to the multilayer body 10. The thin film layer may include a single layer or a plurality of layers. For example, a two-layer configuration of a Ni—Cr alloy layer and a Ni—Cu alloy layer may be used.

The thicknesses of the first thin film layer 51A and the second thin film layer 51B formed with sputtered electrodes, that is, the thickness in the height direction T between the first main surface TS1 and the second main surface TS2 is preferably about 50 nm or more and about 400 nm or less, and more preferably about 50 nm or more and about 130 nm or less, for example.

When a sputtered electrode is formed directly on the first main surface TS1 of the multilayer body 10 such that the first base electrode layer 50A and the second base electrode layer 50B are provided, it is preferable to form a base electrode layer of a fired layer on the first end surface LS1 and the second end surface LS2, or to directly form a plated layer described later without forming the base electrode layer. In the present preferred embodiment, a plated layer to be described later is directly formed on the first end surface LS1 and the second end surface LS2 without forming the base electrode layer.

It is to be noted that, as in a modified example described later, the first base electrode layer 50A and the second base electrode layer 50B may be fired layers. The fired layer preferably contains either or both of a metallic component and a glass component or a ceramic component. The metal component includes, for example, at least one selected from Cu, Ni, Ag, Pd, Ag—Pd alloy, Au, and the like. The glass component includes, for example, at least one selected from B, Si, Ba, Mg, Al, Li, and the like. The ceramic component may be the same type of ceramic material as the dielectric layer 20, or may be a different type of ceramic material. The ceramic component includes, for example, at least one selected from $BaTiO_3$, $CaTiO_3$, $(Ba, Ca)TiO_3$, $SrTiO_3$, $CaZrO_3$, and the like.

The fired layer is formed by, for example, applying an electrically conductive paste containing glass and metal to the multilayer body 10 and firing the resultant product. The fired layer may be obtained by simultaneously firing a multilayer chip having an internal electrode layer and a dielectric layer and an electrically conductive paste applied to the multilayer chip, or may be obtained by firing a multilayer chip having an internal electrode layer and a dielectric layer to obtain a multilayer body 10, and thereafter applying the electrically conductive paste to the multilayer body 10 and firing the resultant product. When the multilayer chip having the internal electrode layer and the dielectric layer and the electrically conductive paste applied to the multilayer chip are simultaneously fired, it is preferable that the fired layer is formed by firing material made by adding ceramic material instead of the glass component. In this case, it is particularly preferable to use the same kind of ceramic material as the dielectric layer 20 as the ceramic material to be added. The fired layer may include a plurality of layers.

Instead of providing the first base electrode layer 50A and the second base electrode layer 50B, the first plated layer 60A and the second plated layer 60B described later may be directly provided on the multilayer body 10.

The first plated layer 60A covers the first base electrode layer 50A.

The second plated layer 60B covers the second base electrode layer 50B.

The first plated layer 60A and the second plated layer 60B may include, for example, at least one selected from Cu, Ni, Sn, Ag, Pd, Ag—Pd alloy, Au, and the like. The first plated layer 60A and the second plated layer 60B may each include a plurality of layers.

When the base electrode layer is a thin film layer, the plated layer preferably includes a three-layer configuration of a Cu plated layer functioning as a lower plated layer, a Ni plated layer functioning as an intermediate plated layer, and a Sn plated layer functioning as an upper plated layer. That is, the first plated layer 60A preferably includes a first Cu plated layer 61A, a first Ni plated layer 62A, and a first Sn plated layer 63A. The second plated layer 60B preferably includes a second Cu plated layer 61B, a second Ni plated layer 62B, and a second Sn plated layer 63B. However, the first plated layer 60A and the second plated layer 60B are not limited to a three-layer configuration, and may have other layer configurations. The first Cu plated layer 61A and the second Cu plated layer 61B are examples of the inner plated layers in the present preferred embodiment of the present invention. The first Ni plated layer 62A, the first Sn plated layer 63A, the second Ni plated layer 62B, and the second Sn plated layer 63B are examples of the outer plated layer in the present preferred embodiment of the present invention.

The first Cu plated layer 61A covers the first end surface LS1 of the multilayer body 10 and the first thin film layer 51A functioning as the first base electrode layer 50A provided on the first main surface TS1 of the multilayer body 10. In the present preferred embodiment, the first Cu plated layer 61A further covers the lateral surface exposed portions 33 where the internal electrode layers 30 are exposed on the first lateral surface WS1 and the second lateral surface WS2 of the multilayer body 10. At this time, since a gap between the first thin film layer 51A and the internal electrode layer 30 exposed on the first end surface LS1 of the multilayer body 10 and a gap between the plurality of internal electrode layers 30 exposed on the surface of the multilayer body 10 are provided narrowly, a plated layer is also deposited in regions of these gaps.

The first Ni plated layer 62A covers the first Cu plated layer 61A. The first Sn plated layer 63A covers the first Ni plated layer 62A. In the present preferred embodiment, the first plated layer 60A is directly electrically connected to the first internal electrode layer 31.

The second Cu plated layer 61B covers the second end surface LS2 of the multilayer body 10 and the second thin film layer 51B functioning as the second base electrode layer 50B provided on the first main surface TS1 of the multilayer body 10. In the present preferred embodiment, the second Cu plated layer 61B further covers the lateral surface exposed portions 33 where the internal electrode layers 30 are exposed on the first lateral surface WS1 and the second lateral surface WS2 of the multilayer body 10. At this time, since a gap between the second thin film layer 51B and the internal electrode layer 30 exposed on the second end surface LS2 of the multilayer body 10 and a gap between the plurality of internal electrode layers 30 exposed on the surface of the multilayer body 10 are provided narrowly, a plated layer is also deposited in regions of these gaps.

The second Ni plated layer 62B covers the second Cu plated layer 61B. The second Sn plated layer 63B covers the second Ni plated layer 62B. In the present preferred embodiment, the second plated layer 60B is electrically connected directly to the second internal electrode layer 32.

By providing the plated layer including the Cu plated layer and the Ni plated layer to cover the base electrode layer, the base electrode layer is prevented from being eroded by the solder when the multilayer ceramic capacitor 1 is mounted. Furthermore, by providing an Sn plated layer on the surface of the Ni plated layer, it is possible to improve wettability of solder when mounting the multilayer ceramic capacitor 1. With such a configuration, it is possible to easily mount the multilayer ceramic capacitor 1.

The thickness per plated layer is preferably about 2 µm or more and about 15 µm or less, for example. That is, the average thickness of each of the first Cu plated layer 61A, the first Ni plated layer 62A, the first Sn plated layer 63A, the second Cu plated layer 61B, the second Ni plated layer 62B, and the second Sn plated layer 63B is preferably about 2 µm or more and about 15 µm or less, for example. More specifically, the average thickness of each of the first Cu plated layer 61A and the second Cu plated layer 61B is more preferably about 5 µm or more and about 8 µm or less, for example. The average thickness of each of the first Ni plated layer 62A, the first Sn plated layer 63A, the second Ni plated layer 62B, and the second Sn plated layer 63B is more preferably about 2 µm or more and about 4 µm or less, for example.

As the overall dimension of the multilayer ceramic capacitor 1 including the multilayer body 10 and the pair of external electrodes 40, the dimension in the height direction T is preferably about 0.06 mm or more and about 0.15 mm or less, the dimension in the length direction L is preferably about 0.30 mm or more and about 0.60 mm or less, and the dimension in the width direction W is preferably about 0.60 mm or more and about 1.0 mm or less, for example. The dimension L in the length direction of the multilayer ceramic capacitor 1 of the present preferred embodiment is smaller than the dimension W in the width direction of the multilayer ceramic capacitor 1. That is, the multilayer ceramic capacitor 1 according to the preferred embodiment is an LW reversed multilayer ceramic capacitor.

Modified Example of Layer Configuration of External Electrode

Figure 10A:
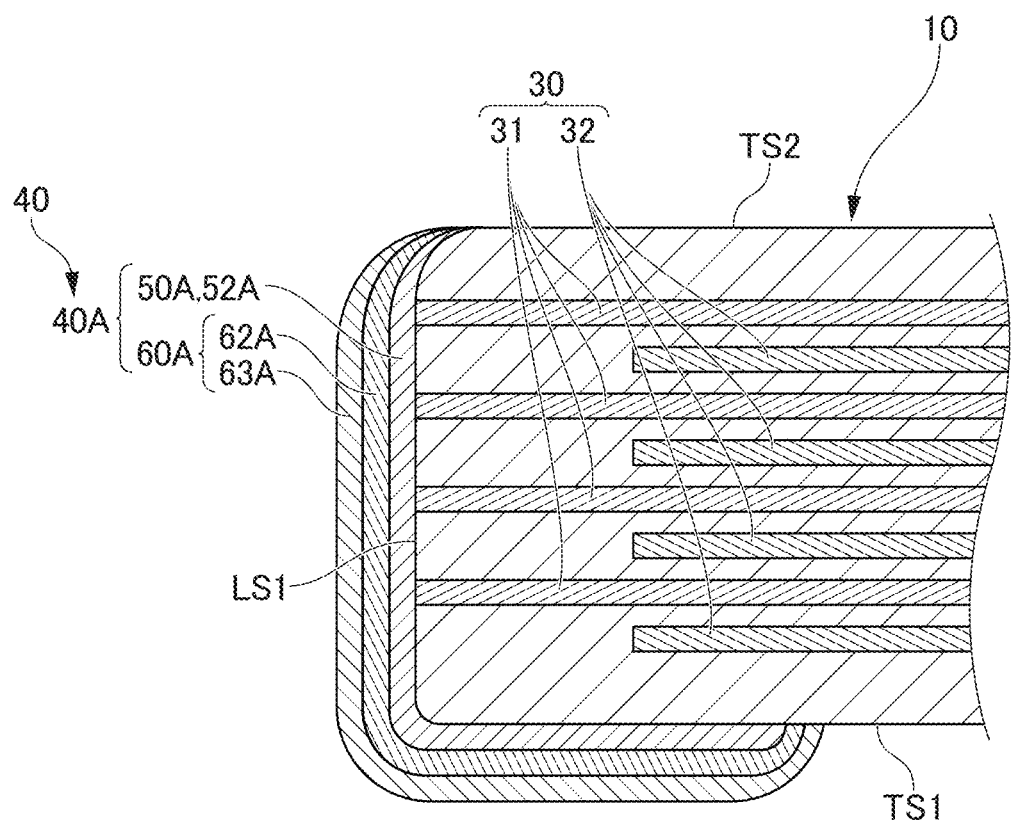
FIG. 10A is a cross-sectional view showing a modified example of the layer configuration of the external electrode of the multilayer ceramic capacitor according to the above preferred embodiment of the present invention and corresponds to FIG. 9A.
Figure 10B:
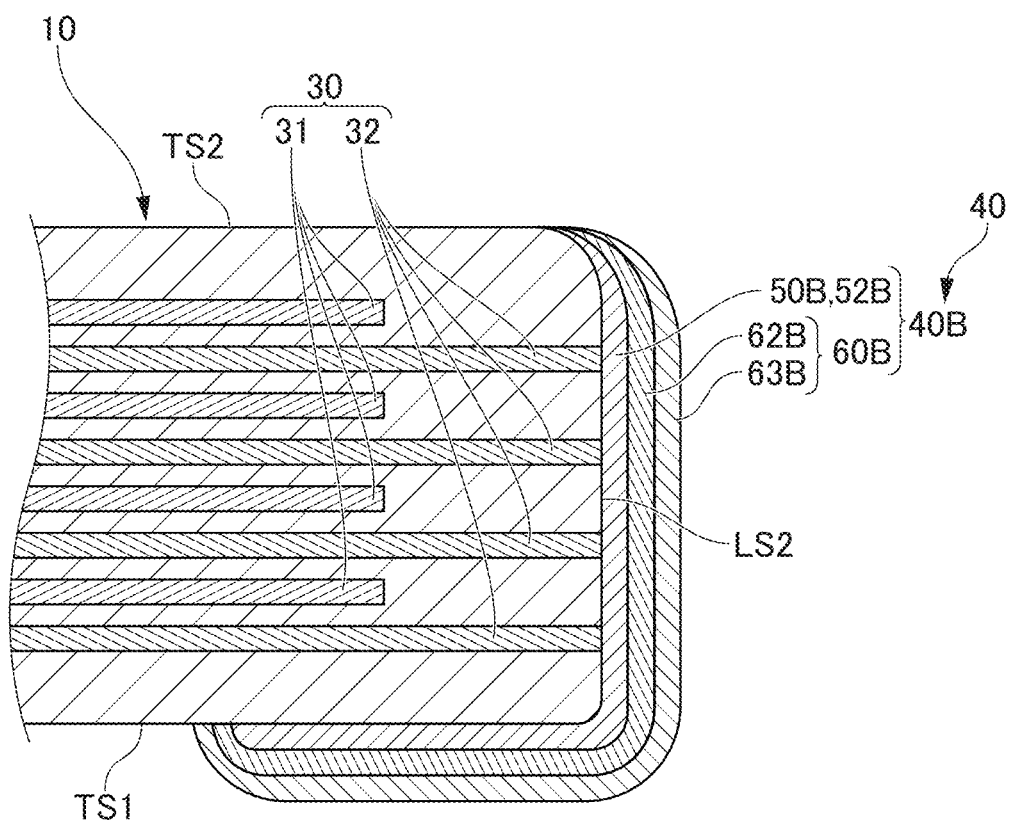
FIG. 10B is a cross-sectional view showing a modified example of the layer configuration of the external electrode of the multilayer ceramic capacitor according to the above preferred embodiment of the present invention and corresponds to FIG. 9B.

Next, a modified example of the layer configuration of the external electrode 40 of the multilayer ceramic capacitor 1 of the present preferred embodiment will be described. In the following description, the same components as those in the above preferred embodiment are denoted by the same reference numerals, and a detailed description thereof is omitted. FIGS. 10A and 10B are cross-sectional views each showing a modified example of the layer configuration of the external electrode 40 of the multilayer ceramic capacitor 1 of the present preferred embodiment, and correspond to FIGS. 9A and 9B, respectively. In this modified example, the configuration of the external electrode 40 is different from that of the above preferred embodiment.

The first external electrode 40A includes a first base electrode layer 50A and a first plated layer 60A. The first base electrode layer 50A of the present modified example includes a first fired layer 52A. The first plated layer 60A of this modified example includes a first Ni plated layer 62A and a first Sn plated layer 63A.

The second external electrode 40B includes a second base electrode layer 50B and a second plated layer 60B. The second base electrode layer 50B of the present modified example includes a second fired layer 52B. The second plated layer 60B of this modified example includes a second Ni plated layer 62B and a second Sn plated layer 63B.

In this modified example, for example, similar to the first external electrode 40A described above, the first base electrode layer 50A includes a first surface portion positioned on the first end surface LS1, a second surface portion positioned on a portion of the first main surface TS1, a third surface portion positioned on a portion of the first lateral surface WS1, and a fourth surface portion positioned on a portion of the second lateral surface WS2. In this modified example, the first base electrode layer 50A is connected to the first internal electrode layer 31.

The first Ni plated layer 62A covers the first base electrode layer 50A. The first Sn plated layer 63A covers the first Ni plated layer 62A.

In this modified example, for example, similar to the second external electrode 40B described above, the second base electrode layer 50B includes a sixth surface portion positioned on the second end surface LS2, a seventh surface portion positioned on a portion of the first main surface TS1, an eighth surface portion positioned on a portion of the first lateral surface WS1, and a ninth surface portion positioned on a portion of the second lateral surface WS2. In this modified example, the second base electrode layer 50B is connected to the second internal electrode layer 32.

The second Ni plated layer 62B covers the second base electrode layer 50B. The second Sn plated layer 63B covers the second Ni plated layer 62B.

The first fired layer 52A of the first base electrode layer 50A and the second fired layer 52B of the second base electrode layer 50B may be made by applying an electrically conductive paste containing glass and metal to a multilayer body, and then firing, for example. In a case where the multilayer chip before firing and the electrically conductive paste applied to the multilayer chip are fired at the same time, it is preferable that the fired layer is formed by firing a component to which a ceramic material is added instead of a glass component. At this time, it is particularly preferable to use the same kind of ceramic material as the dielectric layer 20 as the ceramic material to be added.

When the base electrode layer is a fired layer, the first plated layer 60A and the second plated layer 60B preferably have a two-layer configuration in which a Sn plated layer is provided on the Ni plated layer. In this case, the Ni plated layer reduces or prevents the base electrode layer from being eroded by the solder when the multilayer ceramic capacitor 1 is mounted. Furthermore, it is possible for the Sn plated layer to improve wettability of solder when mounting the multilayer ceramic capacitor 1. With such a configuration, it is possible to mount the multilayer ceramic capacitor 1.

The first plated layer 60A and the second plated layer 60B are not limited to the two-layer configuration as in the above preferred embodiment, and may have a three-layer configuration including Cu plating, or may have other layer configurations. When the Cu plated layer is provided, it is possible to obtain an advantageous effect of reducing or preventing penetration of the plating solution and other moisture.

The thickness per plated layer is preferably about 2 µm or more and about 15 µm or less, for example. That is, the average thickness of each of the first Ni plated layer 62A, the first Sn plated layer 63A, the second Ni plated layer 62B, and the second Sn plated layer 63B is preferably about 2 µm or more and about 15 µm or less, for example. More specifically, the average thickness of each of the first Ni plated layer 62A, the first Sn plated layer 63A, the second Ni plated layer 62B, and the second Sn plated layer 63B is more preferably about 2 µm or more and about 4 µm or less, for example.

Manufacturing Method

Next, a non-limiting example of a method of manufacturing the multilayer ceramic capacitor 1 of the present preferred embodiment will be described.

A dielectric sheet for manufacturing the dielectric layer 20 and an electrically conductive paste for manufacturing the internal electrode layer 30 are provided. Both the dielectric sheet for manufacturing the dielectric layer 20 and the electrically conductive paste for manufacturing the internal electrode layer 30 include a binder and a solvent. The binder and the solvent may be well known. The paste made of an electrically conductive material is, for example, a paste obtained by adding an organic binder and an organic solvent to metal powder.

An electrically conductive paste for manufacturing the internal electrode layer 30 is printed on the dielectric sheet by using a printing plate designed to have the shape of the internal electrode layer 30 of the present preferred embodiment, for example, by screen printing or gravure printing. With such a configuration, a dielectric sheet having a pattern of the first internal electrode layer 31 and a dielectric sheet having a pattern of the second internal electrode layer 32 are provided.

By laminating a predetermined number of dielectric sheets on which patterns of the internal electrode layers 30 are not printed, a portion functioning as the first main surface-side outer layer portion 12 adjacent to the first main surface TS1 is formed. A dielectric sheet on which the pattern of the first internal electrode layer 31 is printed and a dielectric sheet on which the pattern of the second internal electrode layer 32 is printed are sequentially and alternately laminated to form a portion functioning as the inner layer portion 11. A predetermined number of dielectric sheets on which patterns of the internal electrode layers 30 are not printed are laminated on the portion functioning as the inner layer portion 11 to form a portion functioning as the second main surface-side outer layer portion 13 adjacent to the second main surface TS2. With such a configuration, a multilayer sheet is obtained.

Next, the multilayer sheet is pressed in the lamination direction by a means such as hydrostatic pressing to prepare a multilayer block.

Next, the multilayer block is cut into a predetermined size and divided into individual pieces to obtain a plurality of multilayer chips. Thereafter, the multilayer chip may be polished by barrel polishing or the like to round the corner portions and the ridge line portions.

Next, the multilayer chip is fired to obtain the multilayer body 10. The firing temperature at this time depends on the materials of the dielectric layer 20 and the internal electrode layer 30, but is preferably about 900° C. or higher and about 1400° C. or lower, for example.

In the present preferred embodiment, the base electrode layer is a thin film layer. When the base electrode layer is a thin film layer, a thin film layer is formed at a portion of the multilayer body 10 where an external electrode is to be formed by masking or the like. The thin film layer can be formed by a thin film forming method such as sputtering or vapor deposition. In the present preferred embodiment, a sputtered electrode functioning as a thin film layer is formed by a sputtering method.

Figure 12:
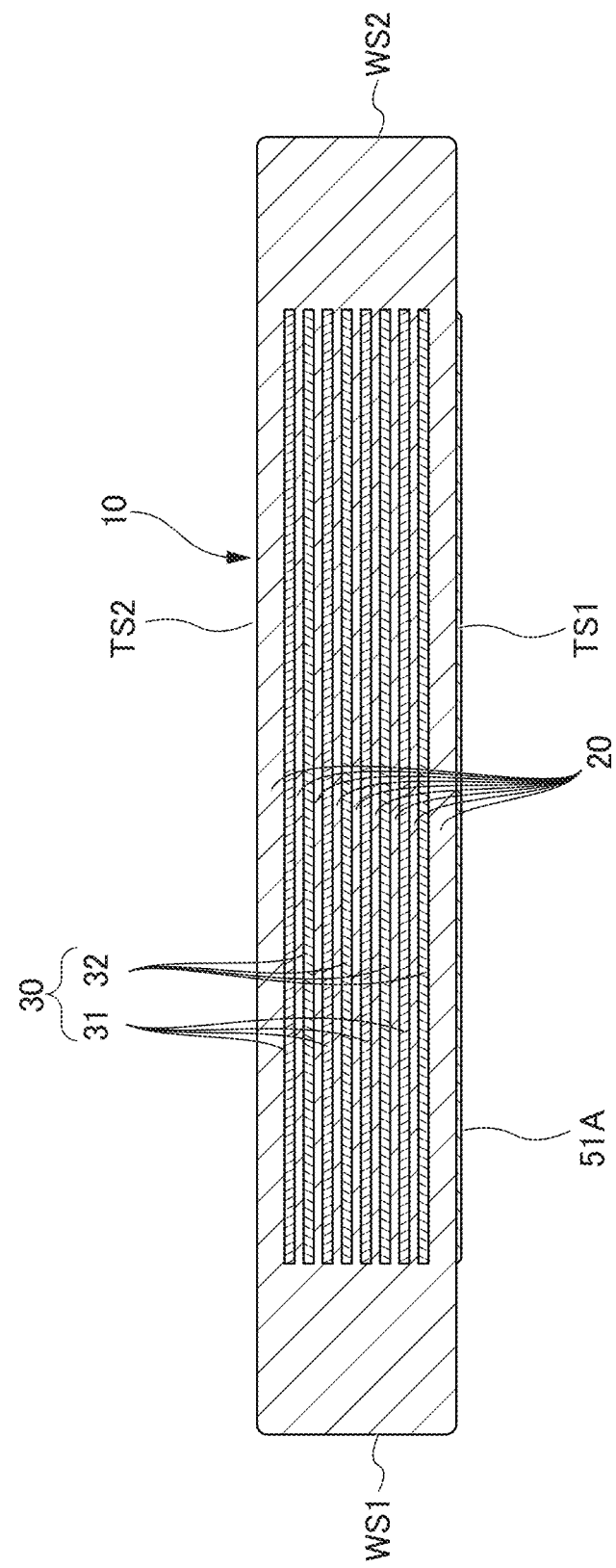
FIG. 12 is a view showing an intermediate state in the manufacturing process of the multilayer ceramic capacitor of the above preferred embodiment of the present invention.
Figure 13:
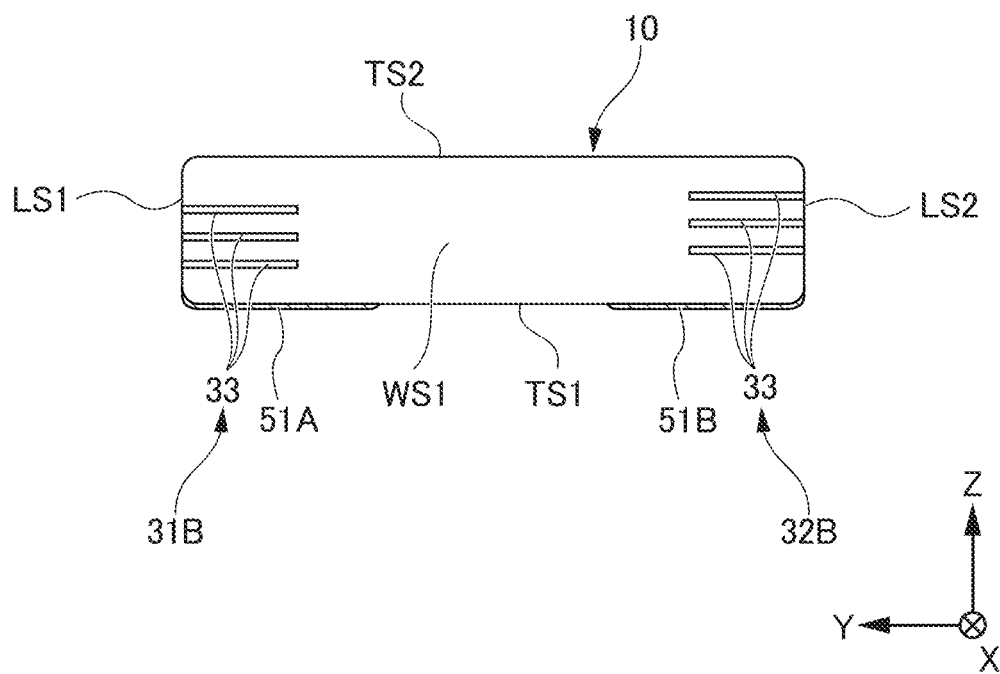
FIG. 13 is a view showing an intermediate state in the manufacturing process of the multilayer ceramic capacitor of the above preferred embodiment of the present invention.

FIG. 11 to FIG. 13 are diagrams each showing an intermediate state in the manufacturing process of the multilayer ceramic capacitor of the present preferred embodiment, and show a state after the thin film layer is provided and before the plated layer is provided on the multilayer body 10. FIG. 11 is a diagram showing a state in which the first thin film layer 51A and the second thin film layer 51B functioning as thin film layers are provided on the multilayer body 10, and corresponds to the LT cross section of FIG. 5. FIG. 12 is a diagram showing a state in which the first thin film layer 51A functioning as a thin film layer is provided on the multilayer body 10, and corresponds to the cross section WT of FIG. 6. FIG. 13 is a view showing a state in which the first thin film layer 51A and the second thin film layer 51B are provided on the multilayer body 10, and is a view showing a surface of the first lateral surface WS1 of the multilayer body 10 corresponding to FIG. 8.

The first thin film layer 51A formed with the sputtered electrode is provided on a portion of the first main surface TS1 adjacent to the first end surface LS1. The second thin film layer 51B formed with the sputtered electrode is provided on a portion of the first main surface TS1 adjacent to the second end surface LS2.

In the present preferred embodiment, the thin film layer formed with the sputtered electrode is provided on a portion of the first main surface TS1, and slightly surrounds a portion of the first end surface LS1 and a portion of the second end surface LS2 continuously from the portion of the first main surface TS1. This makes it possible to control the distance between the thin film layer surrounding the portion of the first end surface LS1 and the portion of the second end surface LS2, and the internal electrode layer 30 exposed at the first end surface LS1 and the second end surface LS2. Therefore, it is possible to deposit a plated layer even on the surface of the multilayer body 10 between the thin film layer surrounding the portion of the first end surface LS1 and the portion of the second end surface LS2, and the internal electrode layer 30 exposed at the first end surface LS1 and the second end surface LS2.

Thereafter, a plated layer is formed on the surfaces of the base electrode layer of the thin film layer, and the multilayer body. In the present preferred embodiment, three plated layers of a Cu plated layer, a Ni plated layer, and a Sn plated layer are formed as plated layers.

The plated layer is formed by electrolytic plating. As the plating method, barrel plating is preferably used.

Furthermore, the plated layer covers the lateral surface exposed portions 33 where the internal electrode layers 30 are exposed at the first lateral surface WS1 and the second lateral surface WS2 of the multilayer body 10. The plated layer covers the lateral surface exposed portions 33 where the internal electrode layers 30 are exposed at the first lateral surface WS1 and the second lateral surface WS2 of the multilayer body 10. At this time, a gap between the thin film layer and the internal electrode layer 30 exposed at the surface of the multilayer body 10, or a gap between the plurality of internal electrode layers 30 exposed at the surface of the multilayer body 10 is formed narrowly, such that a plated layer is also deposited in regions of these gaps.

When it is difficult to control the formation of the plated layer, the plated layer may be formed by masking a portion where the surface of the multilayer body 10 is exposed. This facilitates formation of a plated layer having a desired shape.

When the base electrode layer is a fired layer, the electrically conductive paste functioning as the first base electrode layer is applied to the first surface portion positioned on the first end surface LS1 of the multilayer body 10, the second surface portion positioned on a portion of the first main surface TS1, the third surface portion positioned on a portion of the first lateral surface WS1, and the fourth surface portion positioned on a portion of the second lateral surface WS2 on the first end surface LS1 of the multilayer body 10. Furthermore, the electrically conductive paste functioning as the second base electrode layer is applied to the sixth surface portion positioned on the second end surface LS2 of the multilayer body 10, the seventh surface portion positioned on a portion of the first main surface TS1, the eighth surface portion positioned on a portion of the first lateral surface WS1, and the ninth surface portion positioned on a portion of the second lateral surface WS2 on the second end surface LS2 of the multilayer body 10.

It is to be noted that portions where the base electrode layer is not desired to be provided are masked in advance. After masking, an electrically conductive paste containing a glass component and a metal is applied to the multilayer body 10 by a method such as dipping or screen printing. Thereafter, firing treatment is performed to form a base electrode layer. The temperature of the firing treatment at this time is preferably, for example, about 700° C. or higher and about 900° C. or lower.

In a case where the multilayer chip before firing and the electrically conductive paste applied to the multilayer chip are fired at the same time, it is preferable that the fired layer is formed by firing a component to which a ceramic material is added instead of the glass component. At this time, it is particularly preferable to use the same kind of ceramic material as the dielectric layer 20 as the ceramic material to be added. In this case, an electrically conductive paste is applied to the multilayer chip before firing, and the multilayer chip and the electrically conductive paste applied to the multilayer chip are fired at the same time to form the multilayer body 10 in which the fired layer is provided.

Then, a plated layer is formed on the surface of the base electrode layer made of a fired layer and the multilayer body 10. When the base electrode layer is a fired layer, for example, two plated layers of a Ni plated layer and a Sn plated layer are formed as plated layers. The plated layer is formed by electrolytic plating. As the plating method, barrel plating is preferably used.

When it is difficult to control the formation of the plated layer, the plated layer may be formed by masking a portion where the surface of the multilayer body 10 is exposed. This facilitates formation of a plated layer having a desired shape.

The multilayer ceramic capacitor 1 is manufactured by such a manufacturing process.

Modified Example of Shape of External Electrode

The configuration of the external electrode 40 is not limited to the configuration of the above preferred embodiment. Hereinafter, a first modified example, a second modified example, and a third modified example in which the shape of the external electrode 40 of the multilayer ceramic capacitor 1 of the present preferred embodiment is different from one another will be described. In the following description, the same components as those in the above preferred embodiment are denoted by the same reference numerals, and detailed descriptions thereof are omitted.

Figure 14:
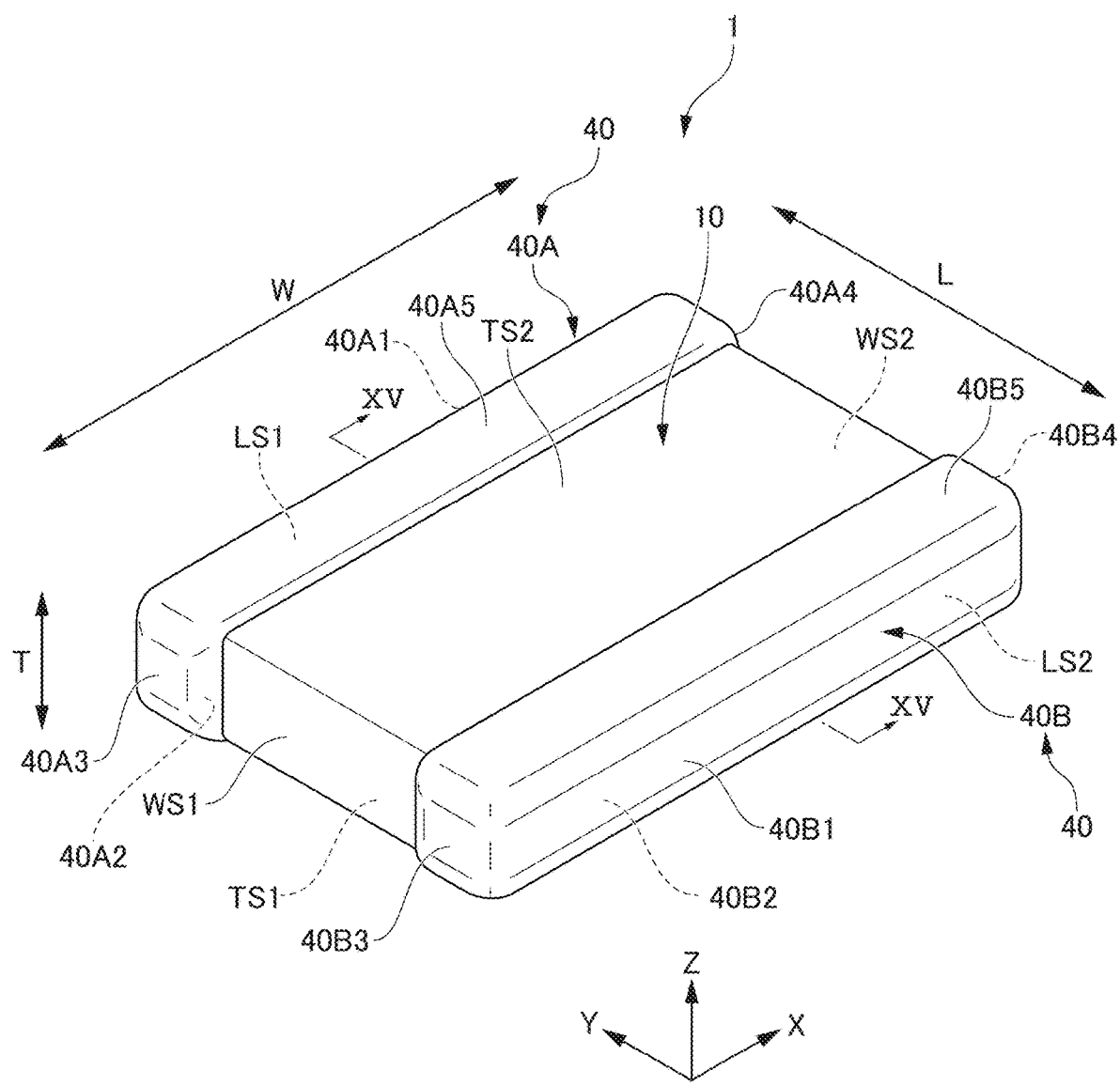
FIG. 14 is an external perspective view showing a multilayer ceramic capacitor to which a first modified example including external electrodes differing in shape in the multilayer ceramic capacitor according to the above preferred embodiment of the present invention is applied, and corresponds to FIG. 1.
Figure 15:
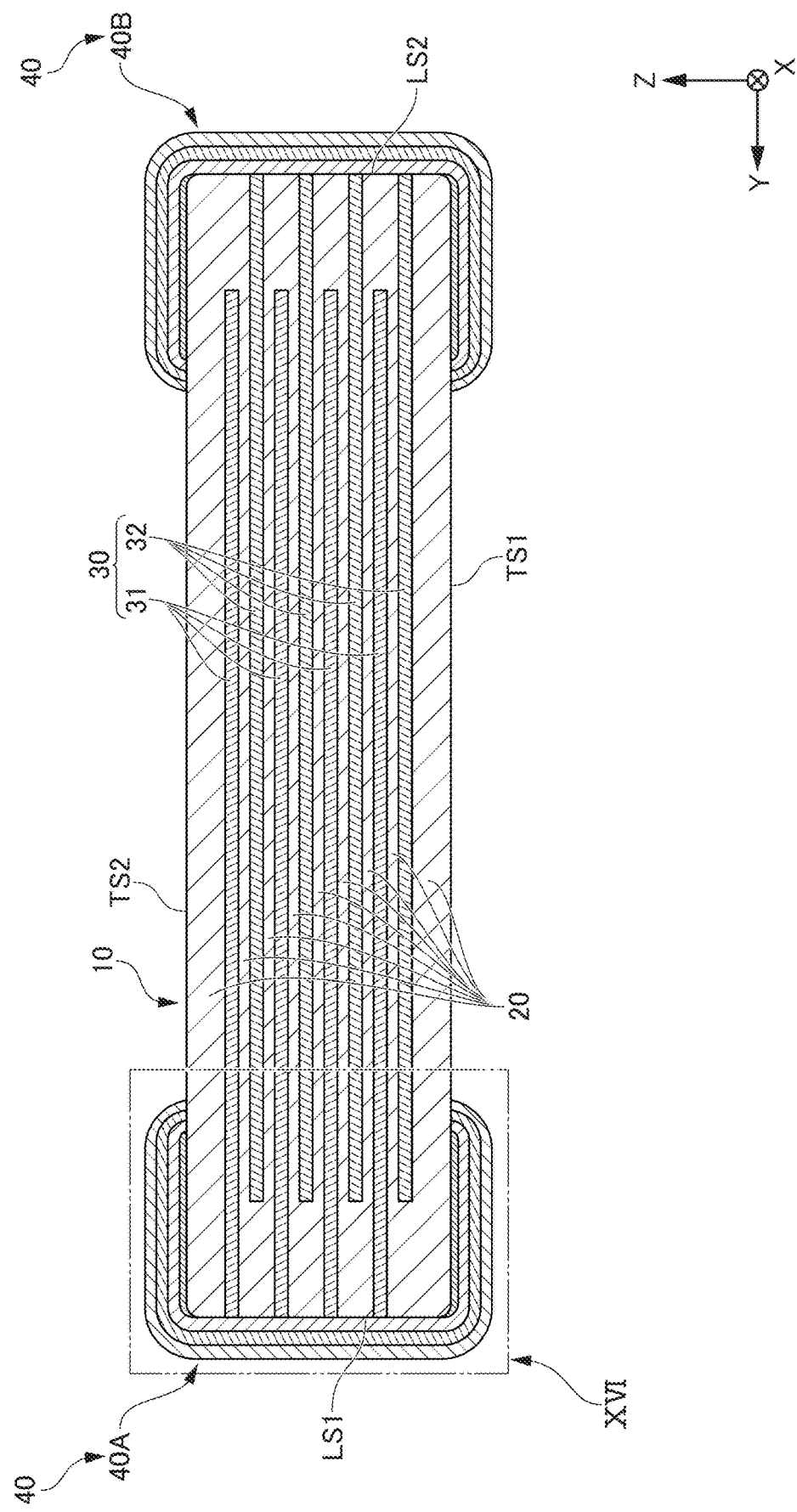
FIG. 15 is a cross-sectional view taken along the line XV-XV in FIG. 14.

FIG. 14 is a perspective view showing a multilayer ceramic capacitor 1 to which the external electrode 40 according to the first modified example is applied, and corresponds to FIG. 1. FIG. 15 is an LT cross-sectional view taken along the line XV-XV of FIG. 14, and corresponds to FIG. 5.

The first external electrode 40A of the first modified example further includes a fifth surface portion 40A5 provided on a portion of the second main surface TS2 of the multilayer body 10 which is not included in the above preferred embodiment. That is, the first external electrode 40A of the first modified example includes the first surface portion 40A1 positioned on the first end surface LS1, the second surface portion 40A2 positioned on a portion of the first main surface TS1, the third surface portion 40A3 positioned on a portion of the first lateral surface WS1, the fourth surface portion 40A4 positioned on a portion of the second lateral surface WS2, and the fifth surface portion 40A5 positioned on a portion of the second main surface TS2. In the first external electrode 40A, one of the second surface portion 40A2 and the fifth surface portion 40A5 is connected to a land of the mounting substrate.

The second external electrode 40B of the first modified example further includes a tenth surface portion 40B5 provided on a portion of the second main surface TS2 of the multilayer body 10 which is not included in the above preferred embodiment. That is, the second external electrode 40B of the first modified example includes the sixth surface portion 40B1 positioned on the second end surface LS2, the seventh surface portion 40B2 positioned on a portion of the first main surface TS1, the eighth surface portion 40B3 positioned on a portion of the first lateral surface WS1, the ninth surface portion 40B4 positioned on a portion of the second lateral surface WS2, and the tenth surface portion 40B5 positioned on a portion of the second main surface TS2. In the second external electrode 40B, one of the seventh surface portion 40B2 and the tenth surface portion 40B5 is connected to a land of the mounting substrate.

As in the above preferred embodiment, the external electrode 40 according to the first modified example includes a base electrode layer and a plated layer provided on the base electrode layer, and the base electrode layer may include at least one selected from a fired layer, a thin film layer, and the like.

Figure 16:
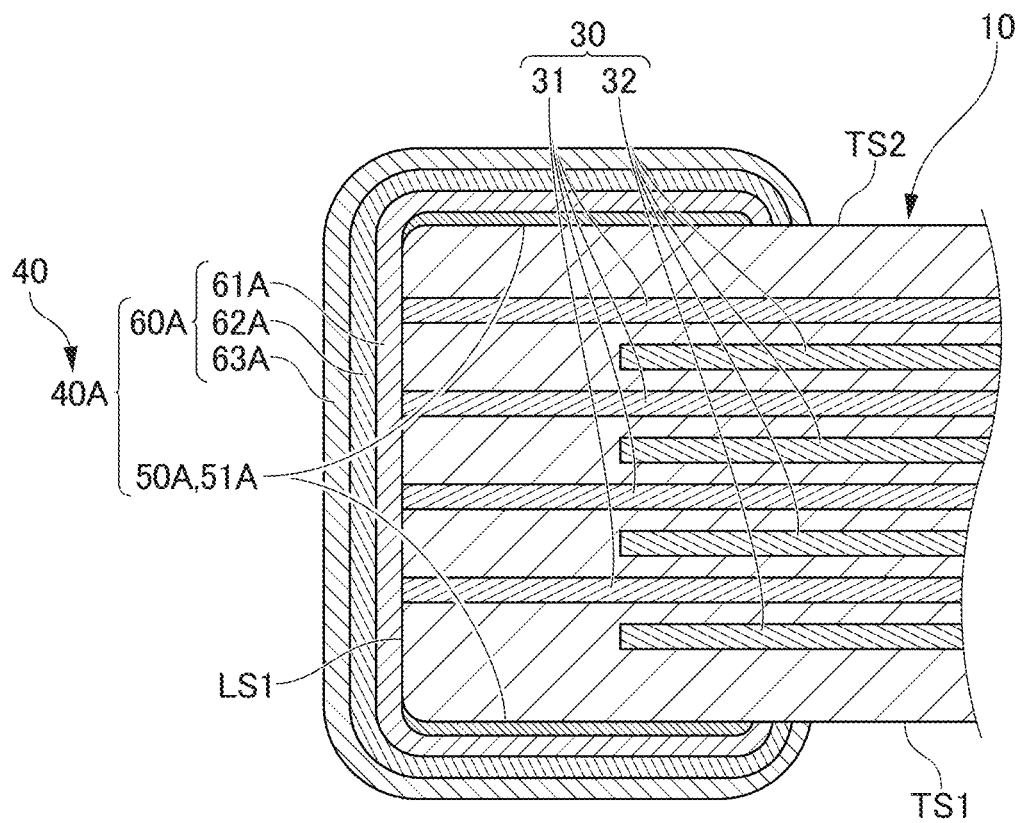
FIG. 16 is an enlarged view of a portion indicated by XVI in FIG. 15.

FIG. 16 is an enlarged view of a portion indicated by XVI in FIG. 15, and corresponds to FIG. 9A. That is, FIG. 16 shows an LT cross section including the first external electrode 40A according to the first modified example. Since the second external electrode 40B according to the first modified example has the same configuration as the first external electrode 40A according to the first modified example, the description of the second external electrode 40B will be omitted by explaining the first external electrode 40A.

As shown in FIG. 16, the first external electrode 40A according to the first modified example includes a first base electrode layer 50A and a first plated layer 60A provided on the first base electrode layer 50A. The first base electrode layer 50A is provided on the surface of the multilayer body 10. The first plated layer 60A covers the first base electrode layer 50A.

The first base electrode layer 50A according to the first modified example is a first thin film layer 51A formed with a sputtered electrode. The first thin film layer 51A formed with the sputtered electrode is provided at a portion of the first main surface TS1 adjacent to the first end surface LS1 and at a portion of the second main surface TS2 adjacent to the first end surface LS1. It is preferable that the first thin film layer 51A is provided on a portion of the first main surface TS1 and slightly surrounds a portion of the first end surface LS1 continuously from the portion of the first main surface TS1. It is preferable that the first thin film layer 51A is provided on a portion of the second main surface TS2 and slightly surrounds a portion of the first end surface LS1 continuously from the portion of the second main surface TS2.

The first plated layer 60A covers the first base electrode layer 50A. The first plated layer 60A preferably includes a first Cu plated layer 61A, a first Ni plated layer 62A, and a first Sn plated layer 63A. However, the first plated layer 60A is not limited to the three-layer configuration, and may have another layer configuration.

The first Cu plated layer 61A covers the first end surface LS1 of the multilayer body 10, and the first thin film layers 51A functioning as the first base electrode layers 50A provided on the first main surface TS1 and the second main surface TS2 of the multilayer body 10. In this case, the first Cu plated layer 61A further covers the lateral surface exposed portions 33 where the internal electrode layers 30 are exposed at the first lateral surface WS1 and the second lateral surface WS2 of the multilayer body 10.

The first Ni plated layer 62A covers the first Cu plated layer 61A. The first Sn plated layer 63A covers the first Ni plated layer 62A. The first plated layer 60A is directly electrically connected to the first internal electrode layer 31.

As shown in FIG. 10A, in the first external electrode 40A of the first modified example, the first base electrode layer 50A may be the first fired layer 52A, and the first plated layer 60A may include a two-layer configuration including the first Ni plated layer 62A and the first Sn plated layer 63A.

Figure 17:
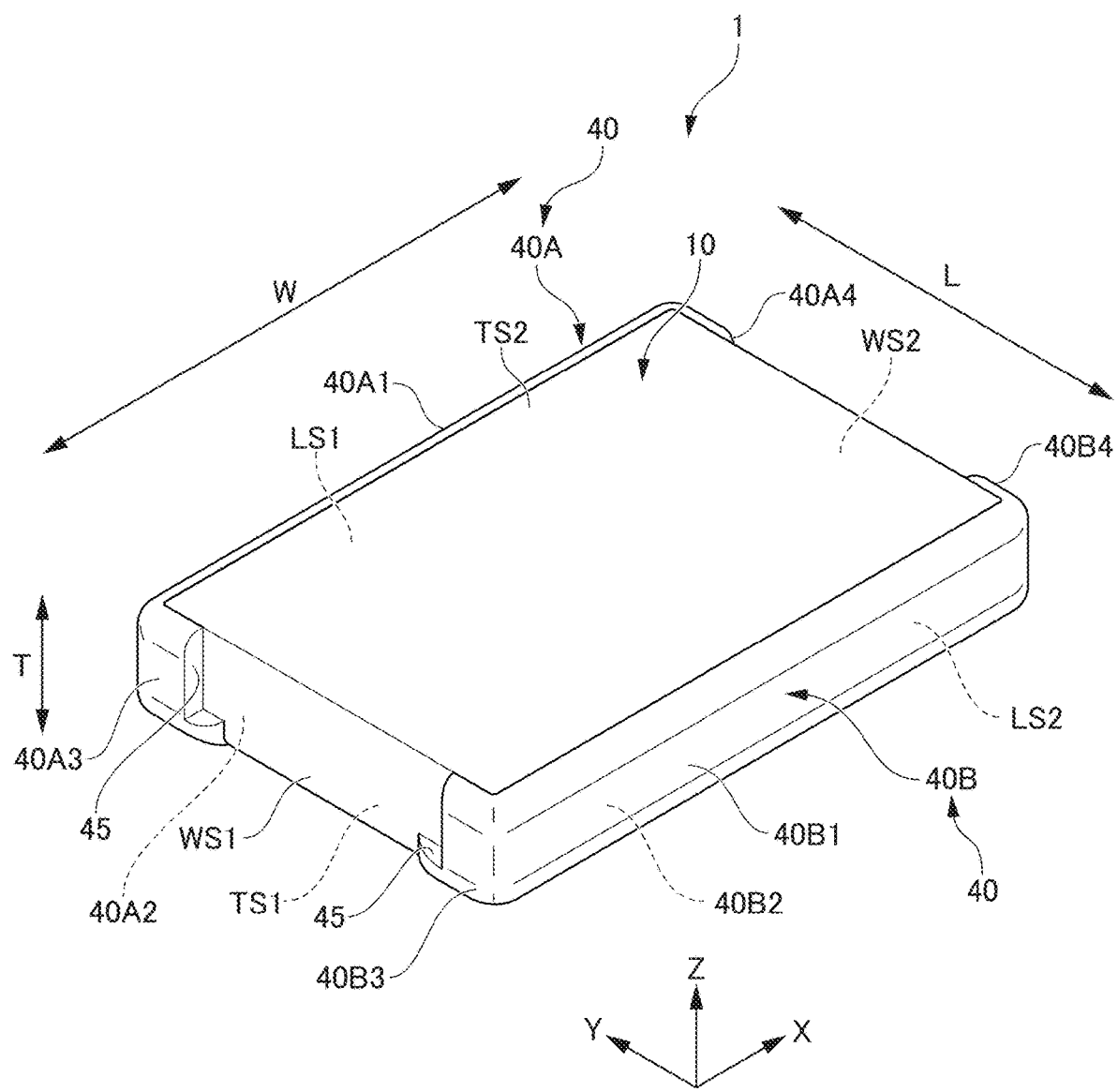
FIG. 17 is an external perspective view showing a multilayer ceramic capacitor to which a second modified example including different external electrodes in shape in the multilayer ceramic capacitor according to the above preferred embodiment of the present invention is applied, and corresponds to FIG. 1.

Next, a second modified example of the external electrode 40 will be described with reference to FIG. 17. FIG. 17 is a perspective view of the multilayer ceramic capacitor 1 to which the external electrode 40 of the second modified example is applied, and corresponds to FIG. 1.

The external electrode 40 according to the second modified example is obtained by modifying the external electrode 40 of the above preferred embodiment shown in FIG. 1, and has a shape in which each of the portions of the external electrode 40 provided on the first lateral surface WS1 and the second lateral surface WS2 of the multilayer body 10 includes a notch which is located adjacent to the second main surface TS2 and inside in the length direction L (adjacent to the second external electrode 40B). That is, as shown in FIG. 17, in the second surface portion 40A3 of the first external electrode 40A, a notch portion 45 is provided which are located adjacent to the second main surface TS2 and inside in the length direction L. Furthermore, in the eighth surface portion 40B3 of the second external electrode 40B, notch portions 45 are provided which are located adjacent to the second main surface TS2 and inside in the length direction L. Although not shown in FIG. 17, a similar notch 45 is provided in each of the fourth surface portion 40A4 of the first external electrode 40A and the ninth surface portion 40B4 of the second external electrode 40B.

The external electrode 40 according to the second modified example may have a layer configuration similar to that of the above preferred embodiment. In other words, the external electrode 40 according to the second modified example may have a layer configuration in which a base layer includes a thin film layer or a fired layer and two or three plated layers are provided on the base layer.

Figure 18:
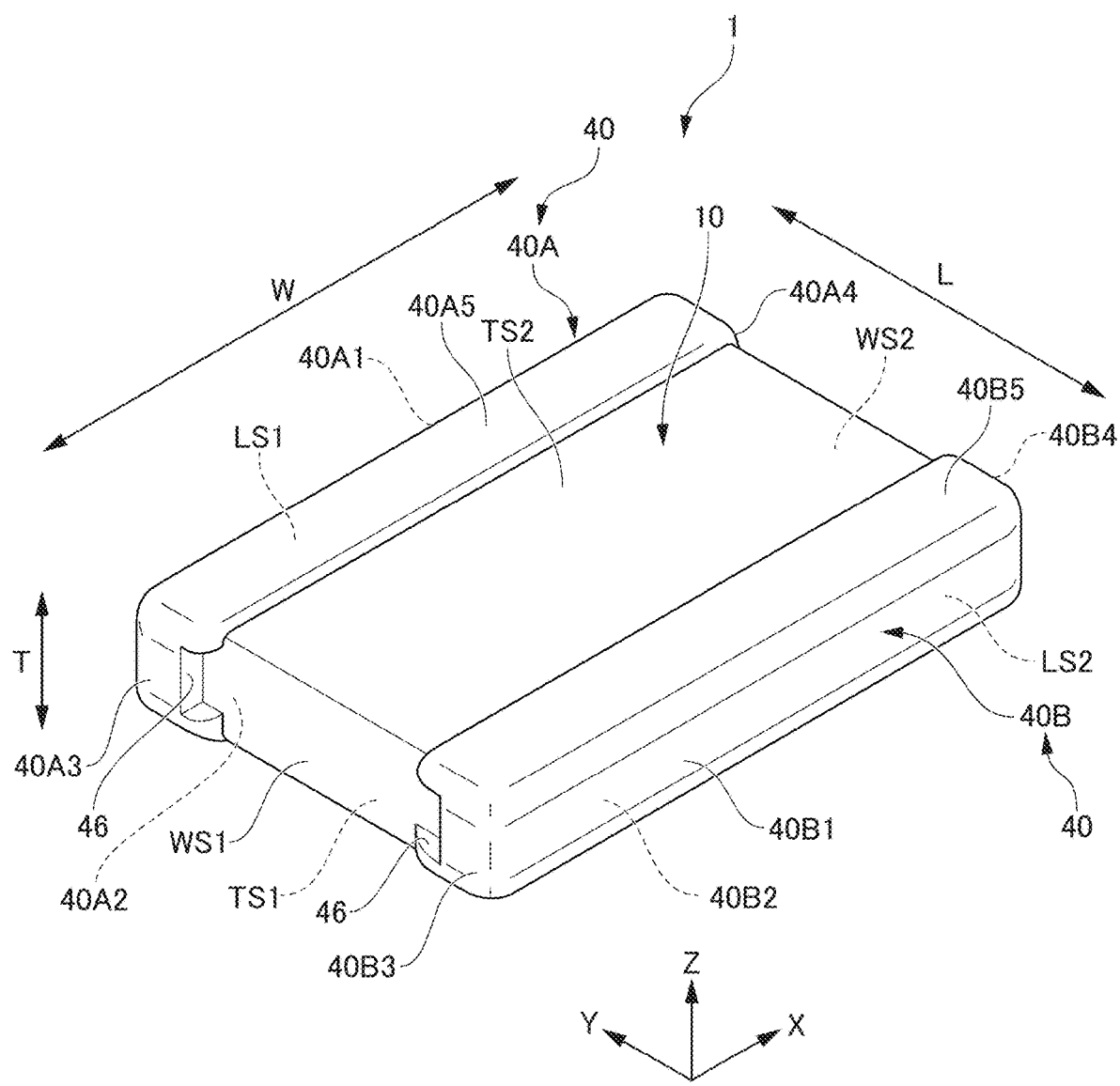
FIG. 18 is an external perspective view showing a multilayer ceramic capacitor to which a third modified example including external electrodes differing in shape in the multilayer ceramic capacitor according to the above preferred embodiment of the present invention is applied, and corresponds to FIG. 1.

Next, a third modified example of the external electrode 40 will be described with reference to FIG. 18. FIG. 18 is a perspective view of a multilayer ceramic capacitor 1 to which the external electrode 40 of the third modified example is applied, and corresponds to FIG. 1.

The external electrode 40 according to the third modified example is obtained by modifying the external electrode 40 according to the first modified example shown in FIG. 14, in which recesses are provided in portions of the external electrode 40 on the first lateral surface WS1 and the second lateral surface WS2 of the multilayer body 10.

That is, as shown in FIG. 18, in the third surface portion 40A3 of the first external electrode 40A, a recess 46 recessed from the inside toward the outside in the width direction W is provided in the middle of the height direction T. The recess 46 is open toward the inside in the width direction W, i.e., toward the second end surface LS2. In the eighth surface portion 40B3 of the second external electrode 40B, a recess 46 recessed from the inside toward the outside in the width direction W is provided in the middle of the height direction T. The recess 46 is open toward the inside in the width direction W, i.e., toward the first end surface LS1. Although not shown in FIG. 18, a similar recess 46 is provided in each of the fourth surface portion 40A4 of the first external electrode 40A and the ninth surface portion 40B4 of the second external electrode 40B. The third surface portion 40A3, the fourth surface portion 40A4, the eighth surface portion 40B3, and the ninth surface portion 40B4 are each an example of a lateral surface covering portion in the preferred embodiment of the present invention in which the recess 46 is provided.

The external electrode 40 according to the third modified example may include a layer configuration similar to that of the above preferred embodiment. In other words, the external electrode 40 according to the third modified example may include a layer configuration in which a base layer includes a thin film layer or a fired layer and two or three plated layers are provided on the base layer.

The multilayer ceramic capacitor 1 according to the preferred embodiment described above has the following advantageous effects.

The multilayer ceramic capacitor 1 according to a preferred embodiment of the present invention includes the multilayer body 10 including the plurality of dielectric layers 20 and the plurality of internal electrode layers 30 laminated alternately in the height direction T, the first main surface TS1 and the second main surface TS2, which are opposed to each other in the height direction T, the first end surface LS1 and the second end surface LS2, which are opposed in the length direction L orthogonal or substantially orthogonal to the height direction T, and the first lateral surface WS1 and the second lateral surface WS2, which are opposed to each other in the width direction W orthogonal or substantially orthogonal to the height direction T and the length direction L, and the pair of external electrodes 40 respectively provided on both ends of the multilayer body in the length direction L to be spaced apart from each other, wherein the plurality of internal electrode layers 30 include first internal electrode layers 31 which extend toward and reach the first end surface LS1, and second internal electrode layers 32 which extend toward and reach the second end surface LS2, in which the pair of external electrodes 40 include the first external electrode 40A which is connected to the first internal electrode layers 31, and is provided on the first end surface LS1, and at least one of a portion of the first main surface TS1 or a portion of the second main surface TS2, and the second external electrode 40B which is connected to the second internal electrode layers 32, and is provided on the second end surface LS2, and at least one of a portion of the first main surface TS1 or a portion of the second main surface TS2, and when the dimension in the length direction L between the first end surface LS1 and the second end surface LS2 of the multilayer body 10 is defined as l, the dimension in the width direction between the first lateral surface WS1 and the second lateral surface WS2 is defined as w, and the dimension in the height direction T between the first main surface TS1 and the second main surface TS2 is defined as t, the dimensional relationship w>l>t is satisfied, in which the first internal electrode layers 31 each include the first counter electrode portion 31A which is located inside the multilayer body 10 and is opposed to the second internal electrode layer 32, and the first extension portion 31B which has a larger dimension in the width direction than the first counter electrode portion 31A and is exposed at the first end surface LS1, a portion of the first lateral surface WS1, and a portion of the second lateral surface WS2, and the second internal electrode layers 32 each include the second counter electrode portion 32A which is located inside the multilayer body 10 and is opposed to the first internal electrode layer 31, and the second extension portion 32B which has a larger dimension in the width direction W than the second counter electrode portion 32A and is exposed at the second end surface LS2, a portion of the first lateral surface WS1, and a portion of the second lateral surface WS2, in which, when the dimension in the length direction L of each of lateral surface exposed portions 33, which are exposed at a portion of the first lateral surface WS1 and a portion of the second lateral surface WS2, of the first extension portion 31B and the second extension portion 32B is defined as e1, the dimension e1 is about 10% or more and about 44% or less with respect to the dimension in the length direction L of the multilayer body 10, and in which, when the dimension in the length direction L from the tip 41A adjacent to the second end surface LS2 to the end 42A adjacent to the first end surface LS1 of the first external electrode 40A provided on at least one of a portion of the first main surface TS1 or a portion of the second main surface TS2, and the dimension in the length direction L from the tip 41B adjacent to the first end surface LS1 to the end 42B adjacent to the second end surface LS2 of the second external electrode 40B provided on at least one of a portion of the first main surface TS1 or a portion of the second main surface TS2 are each defined as e2, the dimension e2 is about 17% or more and about 48% or less with respect to the dimension in the length direction L of the multilayer body 10.

With such a configuration, in the LW reversed multilayer ceramic capacitor 1, even if the thickness, which is the dimension t in the height direction T, is reduced, it is possible to improve the mechanical strength, and it is possible to reduce or prevent the generation of cracks in the inside.

In the multilayer ceramic capacitor 1 according to a preferred embodiment, the dimension t in the height direction T between the first main surface TS1 and the second main surface TS2 is about 150 μm or less, for example.

With such a configuration, even in a case of the thin multilayer ceramic capacitor 1 having a dimension t in the height direction T of about 150 μm or less, since the mechanical strength is improved, cracks hardly occur.

In the multilayer ceramic capacitor 1 according to a preferred embodiment, the dimension t in the height direction T between the first main surface TS1 and the second main surface TS2 is about 100 μm or less, for example.

With such a configuration, even in a case of the thin multilayer ceramic capacitor 1 having the dimension t in the height direction T of about 100 μm or less, since the mechanical strength is improved, cracks hardly occur.

In the multilayer ceramic capacitor 1 according to a preferred embodiment, it is preferable that the external electrode 40A includes the first base electrode layer 50A, the inner plated layer which is provided on the first base electrode layer 50A and provided on the first end surface LS1, and the first Ni plated layer 62A and the first Sn plated layer 63A functioning as the outer plated layers provided on the first Cu plated layer 61A, the external electrode 40B includes the second base electrode layer 50B, the inner plated layer which is provided on the second base electrode layer 50B and provided on the second end surface LS2, and the second Ni plated layer 62B and the second Sn plated layer 63B functioning as the outer plated layers provided on the second Cu plated layer 61B, the first base electrode layer 50A and the second base electrode layer 50B are respectively the first thin film layer 51A and the second thin film layer 51B including at least one metal selected from the group consisting of Mg, Al, Ti, W, Cr, Cu, Ni, Ag, Co, Mo, and V, and the inner plated layers include the first Cu plated layer 61A and the second Cu plated layers 61B, respectively.

With such a configuration, the first Cu plated layer 61A and the second Cu plated layer 61B of the inner plated layers prevent the first base electrode layer 50A and the second base electrode layer 50B from being eroded by the solder when the multilayer ceramic capacitor 1 is mounted. Furthermore, since the first thin film layer 51A and the second thin film layer 51B can be formed by a thin film formation method such as a sputtering method or a vapor deposition method, the first base electrode layer 50A and the second base electrode layer 50B can be easily formed.

In the multilayer ceramic capacitor 1 according to a preferred embodiment, it is preferable that the outer plated layer of the first external electrode 40A includes the first Ni plated layer 62A and the first Sn plated layer 63A provided on the first Ni plated layer 62A, and the outer plated layer of the second external electrode 40B includes the second Ni plated layer 62B and the second Sn plated layer 63B provided on the second Ni plated layer 62B.

With such a configuration, it is possible to improve the wettability of the solder when mounting the multilayer ceramic capacitor 1, and it is possible to easily mount the multilayer ceramic capacitor 1.

EXAMPLES

Examples of preferred embodiments of the present invention will be described below. The multilayer ceramic capacitors having the same configuration as that of the multilayer ceramic capacitor 1 of the above preferred embodiments shown in FIGS. 1 to 9B, in which the dimensions e1 and e2 were changed, were prepared as the Test Examples 1 to 13 shown in Table 1. The fabricated multilayer ceramic capacitors were of the LW reversed type, and two types of multilayer ceramic capacitors having a capacitor size of "1005" (W×L=1.0 mm×0.5 mm) and a capacitor size of "0603" (W×L=0.6 mm×0.3 mm) were fabricated. Table 1 shows the dimensions e1 and e2 of Test Examples 1 to 13, the ratio of the dimensions e1 to the length direction L of the multilayer body, and the ratio of the dimensions e2 to the length direction L of the multilayer body. In the following description, the ratio of the dimension e1 to the length direction L of the multilayer body may be simply referred to as a "ratio of dimension e1", and the ratio of the dimension e2 to the length direction L of the multilayer body may be simply referred to as a "ratio of dimension e2".

The specific dimensions and electrical characteristics of the 1005-size multilayer ceramic capacitor and the 0603-size multilayer ceramic capacitor produced at this time are shown in Table 2.

TABLE 1

|  | CAPACITOR SIZE | e1 (μm) | e2 (μm) | RATIO OF e1 TO ONE DIMENSION | RATIO OF e2 TO ONE DIMENSION | NUMBER OF OCCURRENCES OF CRACKING | MOISTURE RESISTANCE DEGRADATION NUMBER |
|---|---|---|---|---|---|---|---|
| TEST EXAMPLE 1 | 1005 | 20 | 40 | 4% | 8% | 3/10 | 0/20 |
| TEST EXAMPLE 2 | 1005 | 30 | 50 | 6% | 10% | 0/10 | 0/20 |
| TEST EXAMPLE 3 | 1005 | 100 | 120 | 19% | 23% | 0/10 | 0/20 |
| TEST EXAMPLE 4 | 1005 | 150 | 170 | 29% | 33% | 0/10 | 0/20 |
| TEST EXAMPLE 5 | 1005 | 200 | 220 | 38% | 42% | 0/10 | 0/20 |

TABLE 1-continued

| | CAPACITOR SIZE | e1 (μm) | e2 (μm) | RATIO OF e1 TO ONE DIMENSION | RATIO OF e2 TO ONE DIMENSION | NUMBER OF OCCURRENCES OF CRACKING | MOISTURE RESISTANCE DEGRADATION NUMBER |
|---|---|---|---|---|---|---|---|
| TEST EXAMPLE 6 | 1005 | 230 | 250 | 44% | 48% | 0/10 | 0/20 |
| TEST EXAMPLE 7 | 1005 | 260 | 280 | 50% | 54% | 0/10 | 3/20 |
| TEST EXAMPLE 8 | 0603 | 20 | 40 | 7% | 13% | 2/10 | 0/20 |
| TEST EXAMPLE 9 | 0603 | 30 | 50 | 10% | 17% | 0/10 | 0/20 |
| TEST EXAMPLE 10 | 0603 | 60 | 80 | 20% | 27% | 0/10 | 0/20 |
| TEST EXAMPLE 11 | 0603 | 100 | 120 | 33% | 40% | 0/10 | 0/20 |
| TEST EXAMPLE 12 | 0603 | 150 | 170 | 50% | 57% | 0/10 | 0/20 |
| TEST EXAMPLE 13 | 0603 | 180 | 200 | 60% | 67% | 0/10 | 2/20 |

TABLE 2

| CAPACITOR SIZE | LENGTH DIRECTION L | WIDTH DIRECTION W | HEIGHT DIRECTION T | CAPACITANCE | RATED VOLTAGE |
|---|---|---|---|---|---|
| 1005 | 0.52 mm | 1 mm | 0.1 mm | 0.47 μF | 6.3 V |
| 0603 | 0.3 mm | 0.6 mm | 0.1 mm | 0.22 μF | 6.3 V |

Each of Test Example 1, Test Example 2, and Test Example 8 is a comparative example in which both the ratio of the dimension e1 and the ratio of the dimension e2 were lower than the ranges of the present invention. Each of Test Example 7, Test Example 12, and Test Example 13 is a comparative example in which both the ratio of dimension e1 and the ratio of dimension e2 exceeded the ranges of the present invention. In each of Test Examples 3 to 6 and Test Examples 9 to 11, the ratio of the dimension e1 and the ratio of the dimension e2 of preferred embodiments of the present invention were both within the ranges of the present invention.

The multilayer ceramic capacitors of Test Examples 1 to 13 were subjected to the following mechanical strength test and moisture resistance load test.

Mechanical Strength Test

Figure 19:
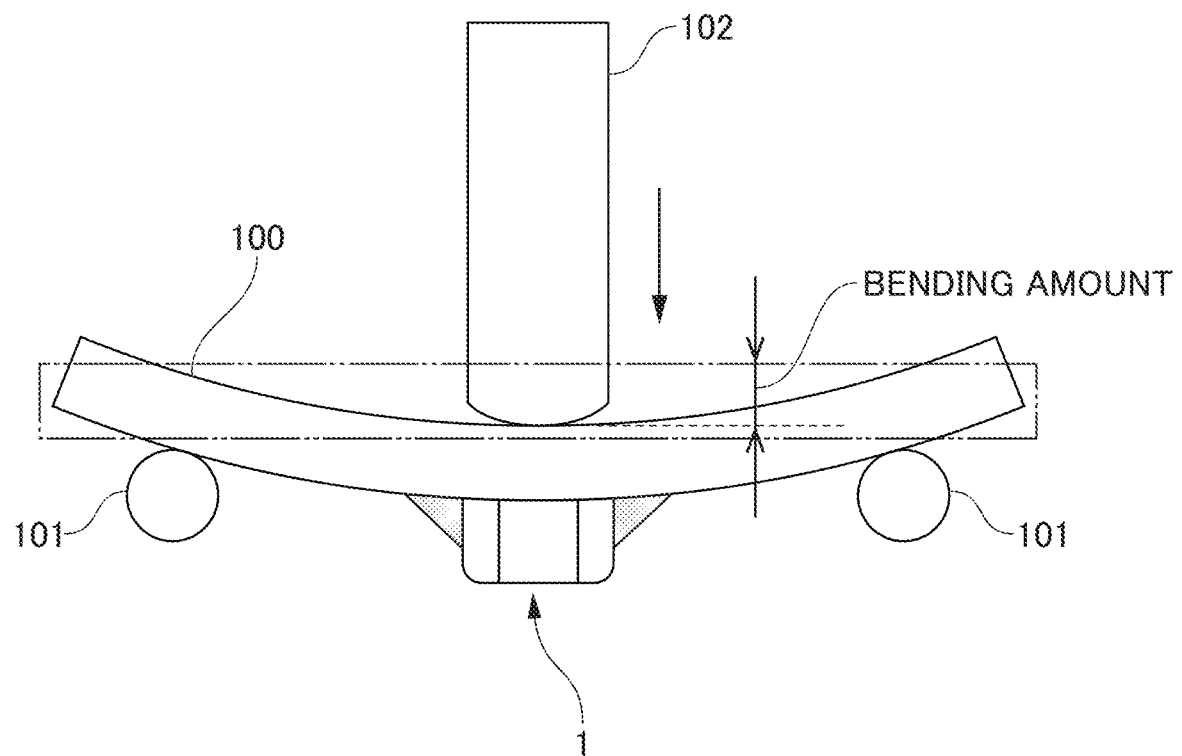
FIG. 19 is a diagram illustrating a method of a mechanical strength test performed in the Examples.

As shown in FIG. 19, each of the examples of the multilayer ceramic capacitors 1 was mounted on one surface of a substrate 100 for mounting having a thickness of 1.6 mm by using solder paste. Next, the substrate 100 was supported on a pair of rollers 101, and a load was applied from the other surface on which the multilayer ceramic capacitor 1 was not mounted by a push bar 102 having a radius of curvature of 1 mm at a speed of 1.0 mm/s to bend the substrate 100, thereby applying mechanical stress to the multilayer ceramic capacitor 1. At this time, the bending amount generated in the substrate 100 was 3 mm, and the substrate 100 was bent for 5±1 seconds.

Next, the multilayer ceramic capacitor 1 removed from the substrate 100 was subjected to cross-sectional polishing, and whether or not cracks were generated inside the multilayer ceramic capacitor 1 was observed. The number of tests was 10 for each test example, and the presence or absence of cracks in at least one of the following four cross sections was observed, and the number of cracks was counted.

The LT cross section immediately after the internal electrode layer 30 was exposed when the multilayer ceramic capacitor 1 was polished so that the dimension in the width direction W was reduced from the first lateral surface WS1 or the second lateral surface WS2.

The LT cross section when the multilayer ceramic capacitor 1 was polished so that the dimension in the width direction W was reduced from the first lateral surface WS1 or the second lateral surface WS2, and when the dimension in the width direction W reached ½.

The LW section immediately after the internal electrode layer 30 was exposed when the multilayer ceramic capacitor 1 was polished so that the dimension in the height direction T was reduced from the first main surface TS1 or the second main surface TS2.

The LW cross section when the multilayer ceramic capacitor 1 was polished so that the dimension in the height direction T was reduced from the first main surface TS1 or the second main surface TS2, and when the dimension T in the height direction reached ½.

Moisture Resistance Load Test

In the moisture-resistant load test, it was examined whether or not there was a change in electrical characteristics more than a prescribed level when a voltage load was applied in a high humidity environment, and the following method was adopted. A multilayer ceramic capacitor attached to a prescribed jig was housed in a test tank having a relative humidity of 85% and a temperature of 85° C. together with the jig, and a state in which a rated voltage of 6.3 V was applied to the multilayer ceramic capacitor was elapsed for 1000 hours. The number of tests was 20 for each test example. The dielectric resistance value of the multilayer ceramic capacitor after the test was measured, and a multilayer ceramic capacitor having a dielectric resistance value of $1.0 \times 10^6 \Omega$ or less was counted as a multilayer ceramic capacitor for which the moisture resistance deteriorated.

The results of the above mechanical strength test and moisture resistance load test are also shown in Table 1.

According to Table 1, it is understood that when the ratio of the dimension e1 is small, the possibility of the occurrence of cracks increases. It is presumed that this is because the area ratio of the internal electrode layer in the multilayer ceramic capacitor decreases and the mechanical strength decreases. On the other hand, it is understood that when the ratio of the dimension e2 increases, the possibility of deterioration of moisture resistance increases. It is considered that this is because the distance in the length direction L between the first external electrode and the second external electrode becomes short, so that the moisture resistance decreases due to migration.

According to Table 1, among Test Examples 1 to 7 of 1005 size, Test Example 1 in which both the ratio of the dimension e1 and the ratio of the dimension e2 of the internal electrode layer were lower than the ranges of the present invention had cracks. Among Test Examples 1 to 7 of 1005 size, Test Example 7 in which both the ratio of the dimension e1 and the ratio of the dimension e2 of the internal electrode layer exceeded the ranges of the present invention had deteriorated moisture resistance. In Test Example 2 as a comparative example, no cracks and no moisture resistance degradation occurred. On the other hand, among Test Examples 8 to 13 of the 0603 size, in the Test Example 8 of the comparative example in which both the ratio of the dimension e1 and the ratio of the dimension e2 of the internal electrode layer were lower than the ranges of the present invention, cracks were generated. Among Test Examples 8 to 13 of 1005 size, Test Example 13 of the comparative example in which both the ratio of the dimension e1 and the ratio of the dimension e2 of the internal electrode layer exceeded the ranges of the present invention had deteriorated moisture resistance. In Test Example 12 of Comparative Example, no cracks and no moisture resistance degradation occurred.

In Test Example 2 of the comparative example, crack generation and deterioration in moisture resistance did not occur, but in Test Example 8 of the comparative example having a value similar to the ratio of dimension e1 and the ratio of dimension e2 of Test Example 2, cracks were generated. Therefore, depending on the capacitor size, it can be said that a multilayer ceramic capacitor having a ratio of the dimension e1 and a ratio of the dimension e2 as in Test Example 2 and Test Example 8 may cause at least cracks. Furthermore, in Test Example 12 of the comparative example, crack generation and moisture resistance degradation did not occur, but in Test Example 7 having a value similar to the ratio of dimension e1 and the ratio of dimension e2 of Test Example 12, the moisture resistance deteriorated. Therefore, depending on the capacitor size, it can be said that a multilayer ceramic capacitor having a ratio of the dimension e1 and a ratio of the dimension e2 of Test Example 7 and Test Example 12 may deteriorate at least in moisture resistance.

As described above, in view of the comprehensive consideration of Test Examples 1 to 13, in the LW reversed multilayer ceramic capacitor, the ratio of the dimension e1 is preferably about 10% or more and about 44% or less, and the ratio of the dimension e2 is preferably about 17% or more and about 48% or less, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including a plurality of dielectric layers and a plurality of internal electrode layers laminated alternately in a height direction, a first main surface and a second main surface which are opposed to each other in the height direction, a first end surface and a second end surface which are opposed in a length direction orthogonal or substantially orthogonal to the height direction, and a first lateral surface and a second lateral surface which are opposed to each other in a width direction orthogonal or substantially orthogonal to the height direction and the length direction; and
a pair of external electrodes respectively provided on both ends of the multilayer body in the length direction and spaced apart from each other; wherein
the plurality of internal electrode layers include:
first internal electrode layers which extend toward and reach the first end surface; and
second internal electrode layers which extend toward and reach the second end surface;
the pair of external electrodes include:
a first external electrode which is connected to the first internal electrode layers, and is provided on the first end surface, and at least one of a portion of the first main surface or a portion of the second main surface; and
a second external electrode which is connected to the second internal electrode layers, and is provided on the second end surface, and at least one of a portion of the first main surface or a portion of the second main surface;
when a dimension in the length direction between the first end surface and the second end surface of the multilayer body is defined as l, a dimension in the width direction between the first lateral surface and the second lateral surface is defined as w, and a dimension in the height direction between the first main surface and the second main surface is defined as t, a dimensional relationship w>l>t is satisfied;
the first internal electrode layers each include a first counter electrode portion which is located inside the multilayer body and is opposed to the second internal electrode layer, and a first extension portion which has a larger dimension in the width direction than the first counter electrode portion and is exposed at the first end surface, a portion of the first lateral surface and a portion of the second lateral surface; and
the second internal electrode layers each include a second counter electrode portion which is located inside the multilayer body and is opposed to the first internal electrode layer, and a second extension portion which has a larger dimension in the width direction than the second counter electrode portion and is exposed at the second end surface, a portion of the first lateral surface and a portion of the second lateral surface;
when a dimension in the length direction of each of lateral surface exposed portions, which are exposed at a portion of the first lateral surface and a portion of the second lateral surface, of the first extension portion and the second extension portion is defined as e1, the dimension e1 is about 10% or more and about 44% or less with respect to the dimension in the length direction of the multilayer body; and
when a dimension in the length direction from a tip adjacent to the second end surface to an end adjacent to the first end surface of the first external electrode provided on at least one of a portion of the first main surface or a portion of the second main surface, and a dimension in the length direction from a tip adjacent to the first end surface to an end adjacent to the second end surface of the second external electrode provided on at least one of a portion of the first main surface or a portion of the second main surface are each defined as e2, the dimension e2 is about 17% or more and about 48% or less with respect to the dimension in the length direction of the multilayer body.

2. The multilayer ceramic capacitor according to claim 1, wherein the dimension in the height direction between the first main surface and the second main surface is about 150 μm or less.

3. The multilayer ceramic capacitor according to claim 1, wherein the dimension in the height direction between the first main surface and the second main surface is about 100 μm or less.

4. The multilayer ceramic capacitor according to claim 1, wherein
the pair of external electrodes include base electrode layers, inner plated layers which are provided on the base electrode layers and provided on the first end surface and the second end surface, respectively, and outer plated layers provided on the inner plated layers;

the base electrode layers are each a thin film layer including at least one metal selected from the group consisting of Mg, Al, Ti, W, Cr, Cu, Ni, Ag, Co, Mo, and V; and the inner plated layers each include a Cu plated layer.

5. The multilayer ceramic capacitor according to claim 4, wherein the outer plated layers each include a Ni plated layer and a Sn plated layer provided on the Ni plated layer.

6. The multilayer ceramic capacitor according to claim 1, wherein each of the first external electrode and the second external electrode includes a lateral surface covering portion that covers at least one of the first lateral surface or the second lateral surface of the multilayer body; and the lateral surface covering portion includes a recess that is recessed from an inside toward an outside in the length direction at a central portion in the height direction thereof.

7. The multilayer ceramic capacitor according to claim 1, wherein the multilayer body has a rectangular parallelepiped shape or a substantially rectangular parallelepiped shape.

8. The multilayer ceramic capacitor according to claim 1, wherein the multilayer body includes rounded corner portions and ridge portions.

9. The multilayer ceramic capacitor according to claim 1, wherein each of the plurality of dielectric layers has a thickness of about 0.4 μm or more and about 2 μm or less.

10. The multilayer ceramic capacitor according to claim 1, wherein a number of the plurality of dielectric layers included in the multilayer body is between 10 and 200.

11. The multilayer ceramic capacitor according to claim 1, wherein each of the first counter electrode portion and the second counter electrode portion has a rectangular or substantially rectangular shape.

12. The multilayer ceramic capacitor according to claim 1, wherein each of the first extension portion and the second extension portion has a rectangular or substantially rectangular shape.

13. The multilayer ceramic capacitor according to claim 1, wherein the dimension e1 is about 30 μm or more and about 230 μm or less.

14. The multilayer ceramic capacitor according to claim 1, wherein each of the first internal electrode layers and the second internal electrode layers has a thickness of about 0.2 μm or more and about 2.0 μm or less.

15. The multilayer ceramic capacitor according to claim 1, wherein a total number of the first internal electrode layers and the second internal electrode layers is 15 or more and 200 or less.

16. The multilayer ceramic capacitor according to claim 1, wherein the dimension l in the length direction between the first end surface and the second end surface of the multilayer body is about 0.30 mm or more and about 0.60 mm or less.

17. The multilayer ceramic capacitor according to claim 1, wherein the dimension w in the width direction between the first lateral surface and the second lateral surface of the multilayer body 10 is about 0.60 mm or more and about 1.0 mm or less.

18. The multilayer ceramic capacitor according to claim 11, wherein the dimension t in the height direction between the first main surface and the second main surface of the multilayer body is about 150 μm or less or about 100 μm.

* * * * *